United States Patent
Lee et al.

(10) Patent No.: US 10,768,887 B2
(45) Date of Patent: Sep. 8, 2020

(54) ELECTRONIC APPARATUS, DOCUMENT DISPLAYING METHOD THEREOF AND NON-TRANSITORY COMPUTER READABLE RECORDING MEDIUM

(71) Applicant: SAMSUNG ELECTRONICS CO., LTD., Suwon-si (KR)

(72) Inventors: Hyun-woo Lee, Seoul (KR); Ji-man Kim, Suwon-si (KR); Chan-jong Park, Seoul (KR); Do-jun Yang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/485,721

(22) PCT Filed: Jan. 3, 2018

(86) PCT No.: PCT/KR2018/000092
§ 371 (c)(1),
(2) Date: Aug. 13, 2019

(87) PCT Pub. No.: WO2018/155807
PCT Pub. Date: Aug. 30, 2018

(65) Prior Publication Data
US 2020/0004493 A1      Jan. 2, 2020

(30) Foreign Application Priority Data

Feb. 22, 2017  (KR) .................. 10-2017-0023509
Nov. 13, 2017  (KR) .................. 10-2017-0150794

(51) Int. Cl.
*G06F 3/16*      (2006.01)
*G06F 16/783*   (2019.01)
(Continued)

(52) U.S. Cl.
CPC .............. *G06F 3/16* (2013.01); *G06F 3/017* (2013.01); *G06F 16/786* (2019.01);
(Continued)

(58) Field of Classification Search
CPC ........ G06F 3/16; G06F 3/017; G06F 16/7844; G06F 16/786; G10L 15/22; G06N 3/08; G06N 99/00
See application file for complete search history.

(56) References Cited

U.S. PATENT DOCUMENTS 7,468,742 B2   12/2008  Ahn et al.
8,693,724 B2    4/2014  Ahmed et al.
(Continued)

FOREIGN PATENT DOCUMENTS

EP   1 892 608 A1    2/2008
JP   11-259269 A     9/1999
(Continued)

OTHER PUBLICATIONS

International Search Report dated Apr. 17, 2018 issued by the International Searching Authority in counterpart International Application No. PCT/KR2018/000092 (PCT/ISA/210).
(Continued)

*Primary Examiner* — Stella L. Woo
(74) *Attorney, Agent, or Firm* — Sughrue Mion, PLLC

(57) ABSTRACT

The disclosure relates to an artificial intelligence (AI) system using a machine learning algorithm such as deep learning, and an application thereof. In particular, an electronic apparatus, a document displaying method thereof, and a non-transitory computer readable recording medium are provided. An electronic apparatus according to an embodiment of the disclosure includes a display unit displaying a document, a microphone receiving a user voice, and a processor configured to acquire at least one topic from
(Continued)

contents included in a plurality of pages constituting the document, recognize a voice input through the microphone, match the recognized voice with one of the acquired at least one topic, and control the display unit to display a page including the matched topic.

15 Claims, 20 Drawing Sheets

(51) Int. Cl.
- *G06F 3/01* (2006.01)
- *G06N 3/08* (2006.01)
- *G06N 99/00* (2019.01)
- *G10L 15/22* (2006.01)

(52) U.S. Cl.
CPC .......... *G06F 16/7844* (2019.01); *G06N 3/08* (2013.01); *G06N 99/00* (2013.01); *G10L 15/22* (2013.01)

(56) References Cited

U.S. PATENT DOCUMENTS

| | | | |
|---|---|---|---|
| 9,654,845 B2 | 5/2017 | Yoo et al. | |
| 2005/0283475 A1* | 12/2005 | Beranek | |
| 2008/0088617 A1 | 4/2008 | Izumida | |
| 2010/0138797 A1 | 6/2010 | Thorn | |
| 2012/0016960 A1* | 1/2012 | Gelb | G06Q 10/10 709/217 |
| 2012/0300080 A1 | 11/2012 | Batson | |
| 2013/0124534 A1* | 5/2013 | Dinh | G06F 16/338 707/748 |
| 2014/0223273 A1* | 8/2014 | Chung | G06F 16/957 715/205 |
| 2015/0170648 A1 | 6/2015 | King et al. | |
| 2015/0286718 A1 | 10/2015 | Wang et al. | |
| 2016/0170710 A1 | 6/2016 | Kim et al. | |
| 2016/0343351 A1* | 11/2016 | Chen | G09G 5/14 |

FOREIGN PATENT DOCUMENTS

| | | |
|---|---|---|
| JP | 2001-014135 A | 1/2001 |
| JP | 2002-268667 A | 9/2002 |
| JP | 3956708 B2 | 8/2007 |
| KR | 10-2012-0063281 A | 6/2012 |
| KR | 10-1504212 B1 | 3/2015 |
| KR | 10-1605474 B1 | 3/2016 |
| KR | 10-2016-0057864 A | 5/2016 |
| KR | 10-2016-0071732 A | 6/2016 |

OTHER PUBLICATIONS

Written Opinion dated Apr. 17, 2018 issued by the International Searching Authority in counterpart International Application No. PCT/KR2018/000092 (PCT/ISA/237).

\* cited by examiner

ELECTRONIC APPARATUS, DOCUMENT DISPLAYING METHOD THEREOF AND NON-TRANSITORY COMPUTER READABLE RECORDING MEDIUM

TECHNICAL FIELD

The disclosure relates to an electronic apparatus, a document displaying method thereof, and a non-transitory computer readable recording medium, and more particularly, to an electronic apparatus that is capable of figuring out a context from a user voice and displaying a corresponding portion of a document, a document displaying method thereof, and a non-transitory computer readable recording medium.

Also, the disclosure relates to an artificial intelligence (AI) system that simulates functions of a human brain such as cognition and determination by using a machine learning algorithm such as deep learning, and application thereof.

BACKGROUND ART

An artificial intelligence (AI) system is a computer system implementing intelligence of a human level, and it is a system wherein a machine learns, determines, and becomes smarter by itself, unlike conventional rule-based smart systems. An artificial intelligence system shows a more improved recognition rate as it is used more, and becomes capable of understanding user preference more correctly. For this reason, conventional rule-based smart systems are gradually being replaced by deep learning-based artificial intelligence systems.

An artificial intelligence technology consists of machine learning (ex. deep learning) and element technologies utilizing machine learning. Machine learning refers to an algorithm technology of classifying and learning the characteristics of input data by oneself. An element technology refers to a technology of utilizing a machine learning algorithm such as deep learning, and may consist of fields of technologies such as linguistic understanding, visual understanding, inference/prediction, knowledge representation, and operation control.

Examples of various fields to which artificial intelligence technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of performing automation processing of information on human experiences into knowledge data, and includes knowledge construction (data generation/classification), knowledge management (data utilization), and the like. Operation control refers to a technology of controlling autonomous driving of vehicles and movements of robots, and the like, and includes movement control (navigation, collision, driving), operation control (behavior control), and the like.

By a conventional machine learning method, it was difficult to find a portion corresponding to a user voice in a document, unless a specific word was included in the user voice. It was because it was impossible to recognize and process a context or a content of a video by conventional machine learning.

Thus, a separate hardware or assistant handing over a presentation material was indispensably needed for a presenter. Also, a problem occurred, which was that a person who was listening to a presentation could not figure out which portion of a presentation material the presenter was explaining, if he or she missed the part that was being explained.

DETAILED DESCRIPTION OF THE INVENTION

Technical Problem

The disclosure is for addressing the aforementioned problem, and the purpose of the disclosure is providing an electronic apparatus that understands the content of a user utterance and displays a portion corresponding to the content of the utterance in a document, a document displaying method thereof, and a non-transitory computer readable recording medium.

Technical Solution

An electronic apparatus according to an embodiment of the disclosure for achieving the aforementioned purpose may include a display unit displaying a document, a microphone receiving a user voice, and a processor configured to acquire at least one topic from contents included in a plurality of pages constituting the document, recognize a voice input through the microphone, match the recognized voice with one of the acquired at least one topic, and control the display unit to display a page including the matched topic.

Also, the processor may identify a relation among the plurality of pages based on a distance among the plurality of pages and the acquired at least one topic, and based on a plurality of pages including the matched topic being present, determine a page to be displayed based on the identified relation among the pages.

In addition, the electronic apparatus according to an embodiment of the disclosure may further include a memory, and the processor may, based on the included contents being videos, analyze the contents in units of frames constituting the videos and acquire at least one topic, and store information on a frame wherein a content for each of the acquired at least one topic starts to be reproduced in the memory.

Also, the processor may, by using the information stored in the memory, control the display unit to reproduce the videos from a frame wherein a content for the matched topic starts to be reproduced.

Further, the processor may control the display unit to highlight the content corresponding to the matched topic on the displayed page.

Also, the electronic apparatus according to an embodiment of the disclosure may further include a motion sensor recognizing a user motion, and the processor may control the display unit to highlight a content indicated by the recognized motion.

In addition, the electronic apparatus according to an embodiment of the disclosure may further include a motion sensor recognizing a user motion, and the processor may determine a control operation that the user wants in the voice, control the motion sensor to recognize a user motion when the voice exists, learn the recognized user motion by matching the user motion with the determined control operation, and based on the learned user motion being recognized, perform the matched control operation.

Further, the processor may identify whether a word indicating a page is included in the recognized voice, and based on identifying that the word is included, control the display unit to directly display the page indicated by the identified word without matching, and based on identifying that the word is not included, match the recognized voice with one of the acquired at least one topic.

Meanwhile, a document displaying method of an electronic apparatus according to an embodiment of the disclosure for achieving the aforementioned purpose may include the steps of acquiring at least one topic from contents included in a plurality of pages constituting a document, recognizing a user voice, matching the recognized voice with one of the acquired at least one topic, and displaying a page including the matched topic.

Also, the document displaying method of an electronic apparatus according to an embodiment of the disclosure may further include the step of identifying a relation among the plurality of pages based on a distance among the plurality of pages and the acquired at least one topic. Meanwhile, in the displaying step, if a plurality of pages including the matched topic are present, a page to be displayed may be determined based on the identified relation among the pages.

In addition, in the acquiring step, if the included contents are videos, the contents may be analyzed in units of frames constituting the videos and at least one topic may be acquired, and information on a frame wherein a content for each of the acquired at least one topic starts to be reproduced may be stored.

Also, in the displaying step, by using the stored information, the videos may be reproduced from a frame wherein a content for the matched topic starts to be reproduced.

Meanwhile, the document displaying method of an electronic apparatus according to an embodiment of the disclosure may further include the step of highlighting the content corresponding to the matched topic on the displayed page.

In addition, the document displaying method of an electronic apparatus according to an embodiment of the disclosure may further include the steps of recognizing a user motion, and highlighting a content indicated by the recognized motion.

Further, the document displaying method of an electronic apparatus according to an embodiment of the disclosure may further include the steps of determining a control operation that the user wants in the voice, recognizing a user motion when the voice exists, learning the recognized user motion by matching the user motion with the determined control operation, and based on the learned user motion being recognized, performing the matched control operation.

Also, the document displaying method of an electronic apparatus according to an embodiment of the disclosure may further include the step of identifying whether a word indicating a page is included in the recognized voice. Meanwhile, in the matching step, if it is identified that the word is included, the page indicated by the identified word may be directly displayed without matching, and if it is identified that the word is not included, the recognized voice may be matched with one of the acquired at least one topic.

Meanwhile, a non-transitory computer readable recording medium including a program for executing a document displaying method of an electronic apparatus according to an embodiment of the disclosure for achieving the aforementioned purpose may include a document displaying method including the steps of acquiring at least one topic from contents included in a plurality of pages constituting a document, recognizing a user voice, matching the recognized voice with one of the acquired at least one topic, and displaying a page including the matched topic.

Meanwhile, an intelligent assistant electronic apparatus using an artificial intelligence neural network model according to an embodiment of the disclosure for achieving the aforementioned purpose may include a display unit displaying a document, a microphone, and a processor configured to acquire at least one topic from contents included in a plurality of pages constituting the document by using an artificial intelligence neural network model, recognize a voice input through the microphone, match the recognized voice with one of the acquired at least one topic, and control the display unit to display a page including the matched topic.

Also, the processor may perform voice recognition for the user voice by using an artificial intelligence neural network.

Meanwhile, the intelligent assistant electronic apparatus using an artificial intelligence neural network model according to an embodiment of the disclosure may further include a motion sensor recognizing a user motion, and the processor may determine a control operation that the user wants in the voice, control the motion sensor to recognize a user motion when the voice exists, learn the recognized user motion by matching the user motion with the determined control operation, and based on the learned user motion being recognized, perform the matched control operation.

Effect of the Invention

According to the various embodiments of the disclosure as described above, a page describing a content corresponding to a user utterance can be displayed without a separate operation.

BEST MODE FOR IMPLEMENTING THE DISCLOSURE

Hereinafter, preferable embodiments of the disclosure will be described in detail with reference to the accompanying drawings. Meanwhile, in describing the disclosure, in case it is determined that detailed explanation of related known functions or features may unnecessarily confuse the gist of the disclosure, the detailed explanation will be omitted. Also, the terms that will be described below are terms defined in consideration of their functions in the disclosure, and the definition may vary according to the user, operator, or court decisions. Therefore, the definition should be made based on the overall content of this specification.

Terms including ordinal numbers such as the first, the second, and the like may be used to describe various elements, but the elements are not limited by the terms. Such terms are used only to distinguish one element from another element. For example, a first element may be called a second element, and a second element may be called a first element in a similar manner, without departing from the scope of protection of the disclosure. Also, the term and/or includes a combination of a plurality of related items, or any one item among a plurality of related items.

The terms used in this specification are used only to explain the embodiments, and are not intended to restrict and/or limit the disclosure. Also, singular expressions include plural expressions, unless defined obviously differently in the context. Further, in this specification, terms such as include or have should be construed as designating that there are such characteristics, numbers, operations, elements, components or a combination thereof described in the specification, but not as excluding in advance the existence or possibility of adding one or more of other characteristics, numbers, operations, elements, components or a combination thereof.

Meanwhile, in the embodiments, 'a module' or 'a unit' may perform at least one function or operation, and may be implemented as hardware or software, or as a combination of hardware and software. Further, a plurality of 'modules' or 'units' may be integrated into at least one module and implemented as at least one processor, excluding 'a module' or 'a unit' that needs to be implemented as specific hardware.

Hereinafter, the disclosure will be described in detail with reference to the accompanying drawings.

Figure 1:
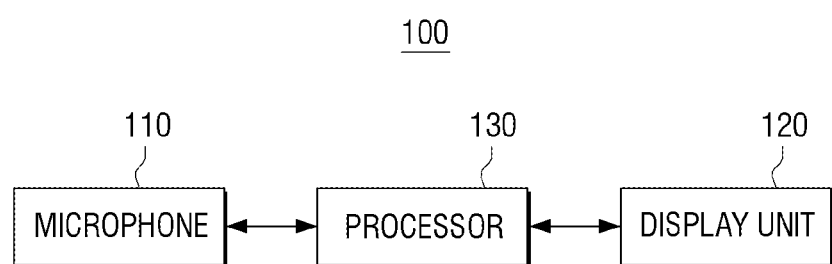
FIG. 1 is a schematic block diagram for illustrating a configuration of an electronic apparatus according to an embodiment of the disclosure.

FIG. 1 is a schematic block diagram for illustrating a configuration of an electronic apparatus 100 according to an embodiment of the disclosure. The electronic apparatus 100 may be implemented as various apparatuses such as a PC, a smart TV, a smartphone, a tablet PC, an electronic frame, a kiosk, etc. Referring to FIG. 1, the electronic apparatus 100 may include a microphone 110, a display unit 120, and a processor 130.

The microphone 110 may receive a voice uttered by a user. For example, the microphone may be installed inside the electronic apparatus 100 and constitute an integrated form, or may be implemented in a separate form.

The display unit 120 may display documents. For example, documents may include presentation materials, e-books, electronic documents (e.g., PDF files), etc. Also, documents may consist of a plurality of pages, and each page may include not only texts, but also still images, videos, URLs, etc.

The processor 130 may acquire at least one topic from contents included in a plurality of pages constituting a document. Also, the processor 130 may acquire a topic for each content included in a document. Contents may include texts, still images, videos, etc. The processor 130 may learn a standard for analyzing texts, analyzing still images, analyzing each frame constituting a video, and analyzing a relation among frames, and recognize the topic of each content based on the learned standard.

In addition, the processor 130 may recognize a user voice received through the microphone 110. Then, the processor 130 may match the recognized voice with an acquired topic. Also, the processor 130 may control the display unit 120 to display a page including the matched topic.

As described above, the electronic apparatus 100 may display a portion of a document corresponding to a content uttered by a user without an additional operation, and thereby improve user convenience.

Figure 2:
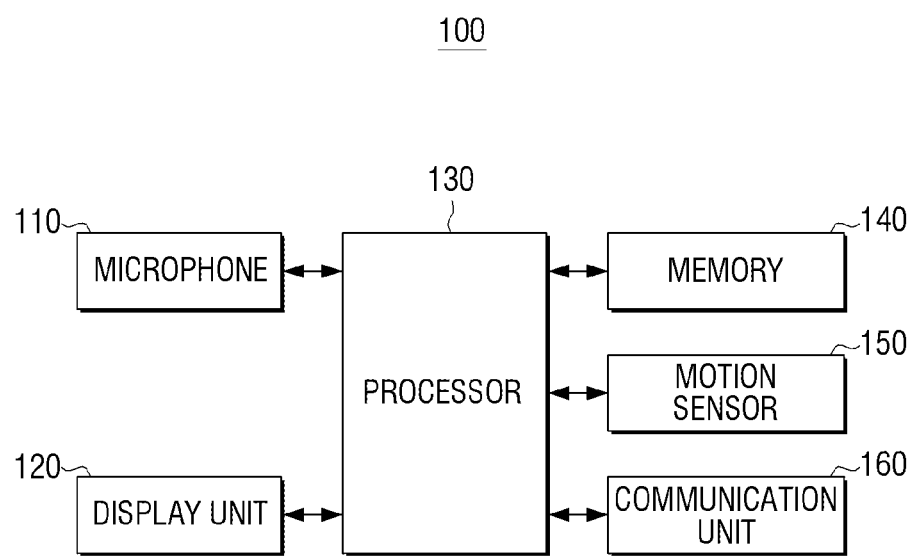
FIG. 2 is a block diagram for illustrating in detail a configuration of an electronic apparatus according to an embodiment of the disclosure.

FIG. 2 is a block diagram for illustrating in detail a configuration of an electronic apparatus 100 according to an embodiment of the disclosure. Referring to FIG. 2, the electronic apparatus 100 may include a microphone 110, a display unit 120, a processor 130, a memory 140, a motion sensor 150, and a communication unit 160. Other than the elements illustrated in the embodiment of FIG. 2, the electronic apparatus 100 may include various elements such as an image reception unit (not shown), an image processing unit (not shown), a power unit (not shown), etc. Also, the electronic apparatus 100 is obviously not limited to be implemented while necessarily including all elements illustrated in FIG. 2.

The microphone 110 may receive a user voice. Also, the microphone 110 may process a voice signal of a user received. For example, the microphone 110 may remove noise from a user voice.

Specifically, when a user voice in an analogue form is input, the microphone 110 may sample the voice, and convert it into a digital signal. Then, the microphone 110 may calculate the energy of the converted digital signal, and determine whether the energy of the digital signal is equal to or greater than a predetermined value. In case the energy of the digital signal is equal to or greater than a predetermined value, the microphone 110 may remove noise components from the digital signal and transmit the signal to the processor 130. For example, the noise components may be sporadic noise that may occur in a surrounding environment.

The display unit 120 may display documents. The display unit 120 may display not only general documents consisting of texts and still images, but also documents including videos, URLs, UIs, etc.

Further, the display unit 120 may be implemented as a liquid crystal display (LCD), an organic light emitting display (OLED) or a plasma display panel (PDP), etc., and may display various screens that can be provided through the electronic apparatus 100.

The memory 140 may store various modules, software, and data for operating the electronic apparatus 100. For example, the memory 140 may store information on a recognized voice, information on an acquired topic, information on a relation between a topic and a topic, information on a relation among a plurality of pages constituting a document, information on the frames of a video content, etc.

As another example, the memory 140 may store an acoustic model (AM) and a language model (LM) that may be used in recognizing a user voice. Also, the memory 140 may store a learning model for analyzing images.

Meanwhile, the memory 140 is a storage medium wherein various programs necessary for operating the electronic apparatus 100 are stored, and may be implemented in the form of a flash memory, a hard disk drive (HDD), a solid state drive (SSD), etc. For example, the memory 140 may include a ROM for storing a program for performing operations of the electronic apparatus 100, and a RAM for temporarily storing data according to performance of operations of the electronic apparatus 100.

Also, the memory 140 may store programs and data for constituting various screens to be displayed on the display 120. In addition, the memory 140 may store programs, applications, and data for performing specific services.

The motion sensor 150 may recognize a user motion. For example, the motion sensor 150 may recognize a three-dimensional movement by a method of photographing a user or receiving reflective light.

The communication unit 160 performs communication with an external apparatus. For example, an external apparatus may be implemented as a server, a cloud storage, a network, etc. The electronic apparatus 100 may directly perform voice recognition, image analysis, etc., or transmit data to an external apparatus and request performance of voice recognition, image analysis, etc. For example, the communication unit 160 may transmit input voice data to an external apparatus, and receive a result of voice recognition from the external apparatus.

For this, the communication unit 160 may include various communication modules like a near field wireless communication module (not shown), a wireless communication module (not shown), etc. Here, a near field wireless communication module is a module for performing communication with an external apparatus located within a short distance, according to a near field wireless communication method such as Bluetooth and Zigbee. Meanwhile, a wireless communication module is a module that is connected to an external network according to a wireless communication protocol such as WiFi, WiFi direct, and IEEE, and performs communication. In addition to the above, a wireless communication module may further include mobile communication modules that are connected to a mobile communication network according to various mobile communication standards such as 3rd Generation (3G), 3rd Generation Partnership Project (3GPP), Long Term Evolution (LTE), LTE Advanced (LTE-A), and the like, and perform communication.

The processor 130 may control the aforementioned elements of the electronic apparatus 100. For example, the processor 130 may control the display unit 120 to display a page having a content corresponding to a recognized user voice.

Also, the processor 130 may be implemented as a single CPU, and perform an operation of recognizing a voice, an operation of understanding a language, an operation of analyzing a still image, an operation of analyzing a video, etc., or it may be implemented as a plurality of processors and an IP performing a specific function. For example, the processor 130 may perform voice recognition based on a traditional hidden Markov model (HMM), or perform voice recognition based on deep learning such as a deep neural network (DNN).

In addition, the processor 130 may analyze contents included in a document, and acquire a topic for each content. Also, the processor 130 may recognize a relation among topics. Based on the recognized relation, the processor 130 may learn a correlation among each page of the document. Through this, the processor 130 may recognize the contents of the document in advance.

The processor 130 may recognize a voice uttered by a user. Then, the processor 130 may determine a page of a document corresponding to the content of the recognized user voice. In particular, even if a user does not utter a word related to a page, the processor 130 may recognize the content of the utterance, and determine a page to be displayed by matching the content with an acquired topic of the document.

Also, the processor 130 may control the display unit 120 to display the determined page. That is, the processor 130 may display a page of a document having a topic corresponding to the content of a voice uttered by a user. Further, the processor 130 may control the display unit 120 to highlight a content corresponding to the topic among the contents included in the corresponding page of the document.

With respect to more detailed operations of the processor 130, description will be made again with reference to an exemplary drawing below.

Figure 3:
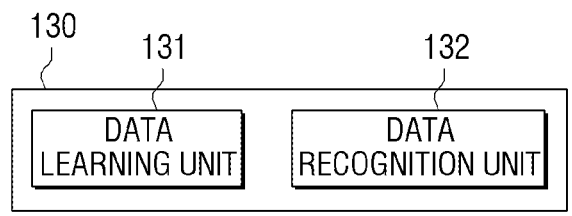
FIG. 3 is a block diagram of a processor according to some embodiments of the disclosure.

FIG. 3 is a block diagram of a processor 130 according to some embodiments of the disclosure. Referring to FIG. 3, the processor 130 according to some embodiments of the disclosure may include a data learning unit 131 and a data recognition unit 132.

The data learning unit 131 may learn a standard for recognition of a voice, understanding of a language, recognition of a text, recognition of an image, and recognition of the content of a video. The processor 130 may recognize the contents of contents such as texts, images, and videos included in a document according to the learned standard. Then, the processor 130 may acquire a topic of each content based on the recognized contents. Also, the processor 130 may acquire a topic by analyzing an input user voice. The processor 130 may analyze an input user voice itself, or convert a user voice into a text, and analyze the text. The data learning unit 131 may determine which data is to be used for recognizing a content. The data learning unit 131 may acquire data to be used for learning, and apply the acquired data to a data recognition model that will be described later, and thereby learn a standard for recognition of a voice, understanding of a language, and recognition of a content.

The data recognition unit 132 may recognize a situation from specific data by using a learned data recognition model. Also, the data recognition unit 132 may acquire specific data according to a predetermined standard by learning, and use a data recognition model with the acquired data as an input value. For example, by using a learned acoustic model and a learned language model, the data recognition unit 132 may recognize an input user voice. Also, the data recognition unit 132 may recognize contents of an image and a video included in a document by using a learned image recognition model. In addition, by using data acquired as a result of an image analysis, a video analysis, a text analysis, and a voice recognition as an input value again, the data recognition unit 132 may update a data recognition model. As described above, the data recognition unit 132 may use big data and user input data in content recognition and topic extraction, etc.

At least one of the data learning unit 131 and the data recognition unit 132 may be manufactured in the form of one or a plurality of hardware chips, and installed on the electronic apparatus 100. For example, at least one of the data learning unit 131 and the data recognition unit 132 may be manufactured in the form of a dedicated hardware chip for artificial intelligence (AI), or as a portion of a conventional generic-purpose processor (e.g., a CPU or an application processor) or an IP for a specific function, and installed on the aforementioned various types of electronic apparatuses 100.

In the embodiment of FIG. 3, a case wherein both of the data learning unit 131 and the data recognition unit 132 are installed on the electronic apparatus 100 is illustrated. However, they may be respectively installed on separate apparatuses. For example, one of the data learning unit 131 and the data recognition unit 132 may be included in the electronic apparatus 100, and the other may be included in a server. Also, the data learning unit 131 and the data recognition unit 132 may be connected with each other by wire or wirelessly, and the model information constructed by the data learning unit 131 may be provided to the data recognition unit 132, and the data input to the data recognition unit 132 may be provided to the data learning unit 131 as additional learning data.

Meanwhile, at least one of the data learning unit 131 and the data recognition unit 132 may be implemented as a software module. In case at least one of the data learning unit 131 and the data recognition unit 132 is implemented as a software module (or, a program module including instructions), the software module may be stored in a non-transitory computer readable recording medium. In this case, the at least one software module may be provided by an operating system (OS), or a specific application. Alternatively, a portion of the at least one software module may be provided by an OS, and the other portions may be provided by a specific application.

Figure 4A:
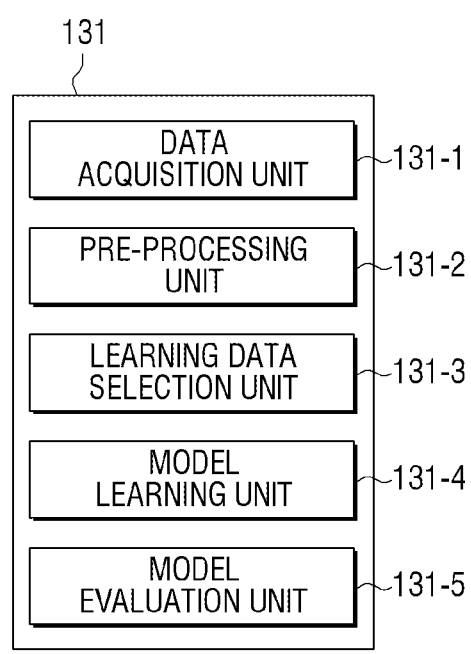
FIG. 4A is a block diagram of a data learning unit according to some embodiments of the disclosure.

FIG. 4A is a block diagram of a data learning unit 131 according to some embodiments of the disclosure. Referring to FIG. 4A, the data learning unit 131 according to some embodiments of the disclosure may include a data acquisition unit 131-1, a pre-processing unit 131-2, a learning data selection unit 131-3, a model learning unit 131-4, and a model evaluation unit 131-5.

The data acquisition unit 131-1 may acquire data necessary for determination of a situation. The data acquisition unit 131-1 may acquire contents (e.g., texts, images, and videos) included in a document. Also, the data acquisition unit 131-1 may convert a voice signal of a user input through the microphone 110 into a digital signal, and acquire voice data. The data acquisition unit 131-1 may receive data for learning in a server or a network like the Internet. For example, the data acquisition unit 131-1 may receive big data images divided according to categories as data for learning.

The pre-processing unit 131-2 may pre-process the acquired data, so that the acquired data can be used for learning for determination of a situation. The pre-processing unit 131-2 may process the acquired data in a predetermined format, so that the model learning unit 131-4 that will be described below can use the acquired data for learning for determination of a situation. For example, the pre-processing unit 131-2 may perform removal of blur, distinction of the background, etc. for an image included in a document.

The learning data selection unit 131-3 may select data necessary for learning among the pre-processed data. The selected data may be provided to the model learning unit 131-4. Also, the learning data selection unit 131-3 may select data necessary for learning among the pre-processed data, according to a predetermined standard for determination of a situation. In addition, the learning data selection unit 131-3 may select data according to a predetermined standard by learning by the model learning unit 131-4 that will be described below.

For example, in an initial stage of learning, the learning data selection unit 131-3 may remove image data in categories having high similarity among image data. That is, for initial learning, the learning data selection unit 131-3 may select image data included in categories having low similarity, so that a standard that is easy to be distinguished can be learned.

Then, the learning data selection unit 131-3 may select image data in categories commonly satisfying one of predetermined standards by learning. Through this, the model learning unit 131-4 may learn a standard that is different from a standard that has already been learned.

The model learning unit 131-4 may learn a standard that is capable of distinguishing which topic a content is related to based on learning data. Also, the model learning unit 131-4 may learn a standard for which learning data is to be used for extraction of a topic.

The model learning unit 131-4 may train a data recognition model used for determination of a situation by using learning data. In this case, the data recognition model may be a model that was constructed in advance. For example, the data recognition model may be a model that was constructed in advance by receiving basic learning data (e.g., image data included in a document, etc.). As another example, the data recognition model may be an image analysis model or a text analysis model constructed in advance by using big data. As still another example, the data recognition model may be a voice recognition model.

A data recognition model may be constructed in consideration of the field to which the recognition model is applied, the purpose of learning, or the computer performance of the apparatus. A data recognition model may be, for example, a model based on an artificial intelligence neural network. For example, models such as a deep neural network (DNN), a recurrent neural network (RNN), and a bidirectional recurrent deep neural network (BRDNN) may be used as a data recognition model, but the disclosure is not limited thereto.

According to the various embodiments of the disclosure, in case there are a plurality of data recognition models constructed in advance, the model learning unit 131-4 may determine a data recognition model wherein relevance between input learning data and basic learning data is big as a data recognition model to be learned. In this case, the basic learning data may have been classified in advance according to the types of data, and data recognition models may have been constructed in advance according to the types of data. For example, the basic learning data may have been classified in advance according to various standards such as an area wherein learning data was generated, the time when learning data was generated, the size of learning data, the genre of learning data, the generator of learning data, the types of objects in learning data, etc.

Also, the model learning unit 131-4 may train a data recognition model by using, for example, a learning algorithm including error back-propagation or gradient descent, and the like.

For example, the model learning unit 131-4 may train a data recognition model through supervised learning using learning data as an input value. As another example, the model learning unit 131-4 may train a data recognition model through unsupervised learning of finding a reference for determination of a situation by self-learning of the types of data necessary for determination of a situation without any supervision. As still another example, the model learning unit 131-4 may train a data recognition model through reinforcement learning of using a feedback on whether a result of determination of a situation according to learning is correct.

Also, when a data recognition model is trained, the model learning unit 131-4 may store the trained data recognition model. In this case, the model learning unit 131-4 may store the trained data recognition model in the memory 140 of the electronic apparatus 100. Alternatively, the model learning unit 131-4 may store the trained data recognition model in a memory of a server connected with the electronic apparatus 100 by a wired or wireless network.

In this case, the memory 140 wherein the trained data recognition model is stored may also store an instruction or data related to at least one different element of the electronic apparatus 100 together. In addition, the memory 140 may store software and/or a program. For example, a program may include a kernel, middleware, an application programming interface (API) and/or an application program (or "an application"), etc.

The model evaluation unit 131-5 may input evaluation data into a data recognition model, and in case a recognition result output from the evaluation data does not satisfy a predetermined standard, the model evaluation unit 131-5 may make the model learning unit 131-4 learn again. In this case, evaluation data may be predetermined data for evaluating a data recognition model.

In an initial stage of constituting a recognition model, evaluation data may be image data having different physical characteristics. Afterwards, evaluation data may be replaced with a set of image data of which similarity becomes gradually identical. Through this, the model evaluation unit 131-5 may gradually verify the performance of a data recognition model.

For example, in case the number or ratio of pieces of evaluation data of which recognition results are not correct, among the recognition results of a data recognition model trained with evaluation data, exceeds a predetermined threshold, the model evaluation unit 131-5 may evaluate that the recognition results do not satisfy a predetermined standard. For example, in case a predetermined standard is defined as a ratio of 2%, and a trained data recognition model outputs incorrect recognition results for pieces of evaluation data of which number exceeds 20 among pieces of evaluation data of which number is 1000 in total, the model evaluation unit 131-5 may evaluate that the trained data recognition model is not appropriate.

Meanwhile, in case there are a plurality of trained data recognition models, the model evaluation unit 131-5 may evaluate each of the trained data recognition models regarding whether it satisfies a predetermined standard, and determine a model satisfying a predetermined standard as a final data recognition model. In this case, if there are a plurality of models satisfying a predetermined standard, the model evaluation unit 131-5 may determine one or a predetermined number of models set in advance in the order of having a higher evaluation score as a final data recognition model (or final data recognition models).

Meanwhile, at least one of the data acquisition unit 131-1, the pre-processing unit 131-2, the learning data selection unit 131-3, the model learning unit 131-4, and the model evaluation unit 131-5 in the data learning unit 131 may be manufactured in the form of at least one hardware chip, and installed on the electronic apparatus. For example, at least one of the data acquisition unit 131-1, the pre-processing unit 131-2, the learning data selection unit 131-3, the model learning unit 131-4, and the model evaluation unit 131-5 may be manufactured in the form of a dedicated hardware chip for artificial intelligence (AI), or as a portion of a conventional generic-purpose processor (e.g., a CPU or an application processor) or an IP for a specific function, and installed on the aforementioned various types of electronic apparatuses 100.

Also, the data acquisition unit 131-1, the pre-processing unit 131-2, the learning data selection unit 131-3, the model learning unit 131-4, and the model evaluation unit 131-5 may be installed on one electronic apparatus, or they may be respectively installed on separate electronic apparatuses. For example, some of the data acquisition unit 131-1, the pre-processing unit 131-2, the learning data selection unit 131-3, the model learning unit 131-4, and the model evaluation unit 131-5 may be included in the electronic apparatus 100, and the others may be included in a server 200.

Meanwhile, at least one of the data acquisition unit 131-1, the pre-processing unit 131-2, the learning data selection unit 131-3, the model learning unit 131-4, and the model evaluation unit 131-5 may be implemented as a software module. In case at least one of the data acquisition unit 131-1, the pre-processing unit 131-2, the learning data selection unit 131-3, the model learning unit 131-4, and the model evaluation unit 131-5 is implemented as a software module (or, a program module including instructions), the software module may be stored in a non-transitory computer readable recording medium. The at least one software module may be provided by an operating system (OS), or a specific application. Alternatively, a portion of the at least one software module may be provided by an OS, and the other portions may be provided by a specific application.

Figure 4B:
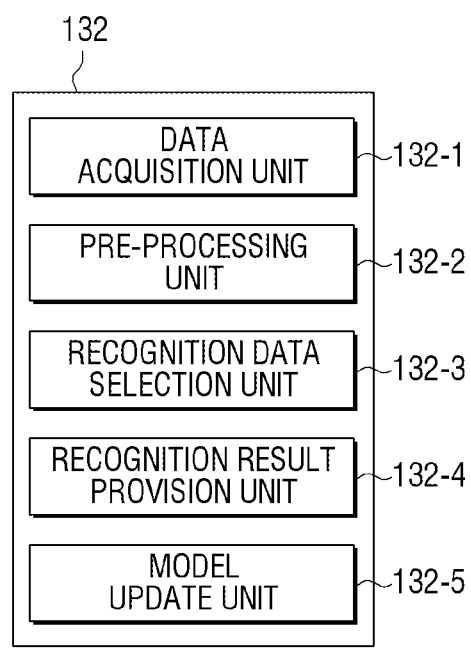
FIG. 4B is a block diagram of a data recognition unit according to some embodiments of the disclosure.

FIG. 4B is a block diagram of a data recognition unit 132 according to some embodiments of the disclosure. Referring to FIG. 4B, the data recognition unit 132 according to some embodiments of the disclosure may include a data acquisition unit 132-1, a pre-processing unit 132-2, a recognition data selection unit 132-3, a recognition result provision unit 132-4, and a model update unit 132-5.

The data acquisition unit 132-1 may acquire data necessary for determination of a situation, and the pre-processing unit 132-2 may preprocess the acquired data so that the acquired data can be used for determination of a situation. Also, the pre-processing unit 132-2 may process the acquired data in a predetermined format so that the recognition result provision unit 132-4 that will be described below can use the acquired data for determination of a situation.

The recognition data selection unit 132-3 may select data necessary for determination of a situation among the pre-processed data. The selected data may be provided to the recognition result provision unit 132-4. Also, the recognition data selection unit 132-3 may select some or all of the pre-processed data according to a predetermined standard for determination of a situation. In addition, the recognition data selection unit 132-3 may select data according to a predetermined standard by learning by the model learning unit 142-4 that will be described below.

The recognition result provision unit 132-4 may determine a situation by applying the selected data to a data recognition model. Also, the recognition result provision unit 132-4 may provide a recognition result according to the purpose of recognizing data. The recognition result provision unit 132-4 may apply the selected data to a data recognition model by using the data selected by the recognition data selection unit 132-3 as an input value. Also, a recognition result may be determined by a data recognition model.

For example, the recognition result provision unit 132-4 may recognize an input user utterance according to a standard for classification determined at a data recognition model. Also, by using a data recognition model, the recognition result provision unit 132-4 may recognize contents included in a content, and extract topics. Then, by using the recognized user voice and the extracted topics, the processor 130 may determine a topic including a content corresponding to the user voice.

The model update unit 132-5 may make a data recognition model updated based on evaluation for a recognition result provided by the recognition result provision unit 132-4. For example, the model update unit 132-5 may provide a recognition result provided by the recognition result provision unit 132-4 to the model learning unit 131-4, and thereby make the model learning unit 131-4 update the data recognition model.

Meanwhile, at least one of the data acquisition unit 132-1, the pre-processing unit 132-2, the recognition data selection unit 132-3, the recognition result provision unit 132-4, and the model update unit 132-5 in the data recognition unit 132 may be manufactured in the form of at least one hardware chip, and installed on the electronic apparatus. For example, at least one of the data acquisition unit 132-1, the pre-processing unit 132-2, the recognition data selection unit 132-3, the recognition result provision unit 132-4, and the model update unit 132-5 may be manufactured in the form of a dedicated hardware chip for artificial intelligence (AI), or as a portion of a conventional generic-purpose processor (e.g., a CPU or an application processor) or an IP for a specific function, and installed on the aforementioned various types of electronic apparatuses 100.

Also, the data acquisition unit 132-1, the pre-processing unit 132-2, the recognition data selection unit 132-3, the recognition result provision unit 132-4, and the model update unit 132-5 may be installed on one electronic apparatus, or they may be respectively installed on separate electronic apparatuses. For example, some of the data acquisition unit 132-1, the pre-processing unit 132-2, the recognition data selection unit 132-3, the recognition result provision unit 132-4, and the model update unit 132-5 may be included in the electronic apparatus 100, and the others may be included in a server 200.

Meanwhile, at least one of the data acquisition unit 132-1, the pre-processing unit 132-2, the recognition data selection unit 132-3, the recognition result provision unit 132-4, and the model update unit 132-5 may be implemented as a software module. In case at least one of the data acquisition unit 132-1, the pre-processing unit 132-2, the recognition data selection unit 132-3, the recognition result provision unit 132-4, and the model update unit 132-5 is implemented as a software module (or, a program module including instructions), the software module may be stored in a non-transitory computer readable recording medium. The at least one software module may be provided by an operating system (OS), or a specific application. Alternatively, a portion of the at least one software module may be provided by an OS, and the other portions may be provided by a specific application.

Figure 5:
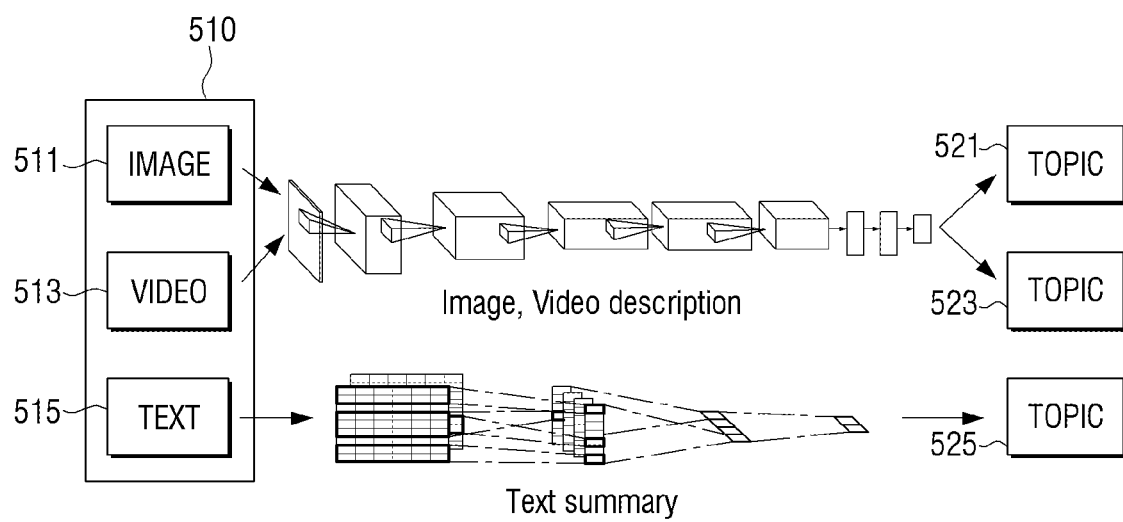
FIG. 5 is a diagram illustrating a model extracting a topic included in a document according to an embodiment of the disclosure.

The electronic apparatus 100 according to an embodiment of the disclosure may acquire at least one topic from contents included in a plurality of pages constituting a document. As illustrated in FIG. 5, a document 510 may include contents having the forms of an image 511, a video 513, and a text 515. The processor 130 may extract topics 521, 523, 525 from each of the image 511, the video 513, and the text 515.

The processor 130 may acquire topics of contents by using a learning technique like deep learning. Also, the processor 130 may construct an image analysis model by a method of training an image group by classifying it into specific topics. The processor 130 does not just determine whether images are identical through characteristic matching, but it may understand contents and contexts included in images by using a constructed image analysis model.

The processor 130 may construct a video analysis model as an extension of image analysis. Then, the processor 130 may understand the content of a video by summing up image frames for a specific section of the video. For example, by analyzing a video wherein a baseball player catches a ball by diving, and throws the ball to the second base, the processor 130 may determine that the video includes a content regarding the defense of an outfielder.

The processor 130 may also use a learning technique like deep learning in text summary analysis. In the case of conventional text summary analysis, it was difficult to derive a topic by understanding the context in case a specific word did not appear. However, the processor 130 may extract a topic even if a specific word does not appear by constructing a text summary analysis model. For example, even if a word indicating a page does not appear, the processor 130 may determine which page the text is explaining about.

Through a method as above, the processor 130 may extract topics 521, 523, 525 from each of the image 511, the video 513, and the text 515 included in the document 510. Also, the processor 130 may integrate the extracted topics 521, 523, 525 into one topic again.

Figure 6:
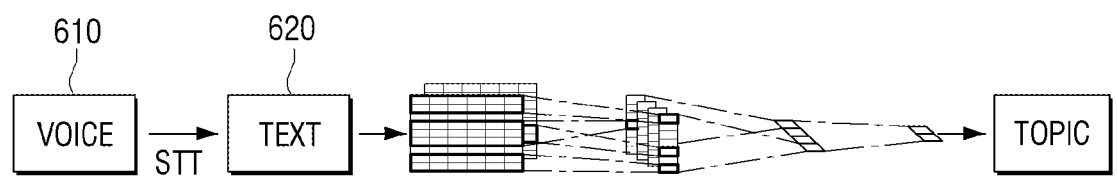
FIG. 6 is a diagram illustrating a model extracting a topic from a user voice according to an embodiment of the disclosure.

According to an embodiment of the disclosure, the processor 130 may recognize a user voice. As illustrated in FIG. 6, the processor 130 may convert a received user voice 610 into a text 620. Then, the processor 130 may extract a topic 630 from the converted text 620 by using a text summary analysis model.

As another example, the processor 130 may directly recognize a received user voice 610 by using a voice recognition model without converting it to a text 620. Then, the processor 130 may extract a topic 630 from the recognized user voice 610. A voice recognition model may recognize the emotional state of a user from the intonation, trembling, etc. of the voice that are not expressed as a text, in addition to recognizing the content of the user voice. The recognized emotional state of the user may be used in understanding the context of the user voice.

Also, the processor 130 may match the topic 630 extracted from the user voice with one of the topics 521, 523, 525 acquired in the document 510. Then, the processor 130 may control the display unit 120 to display the page of the document including the matched topic.

Figure 7:
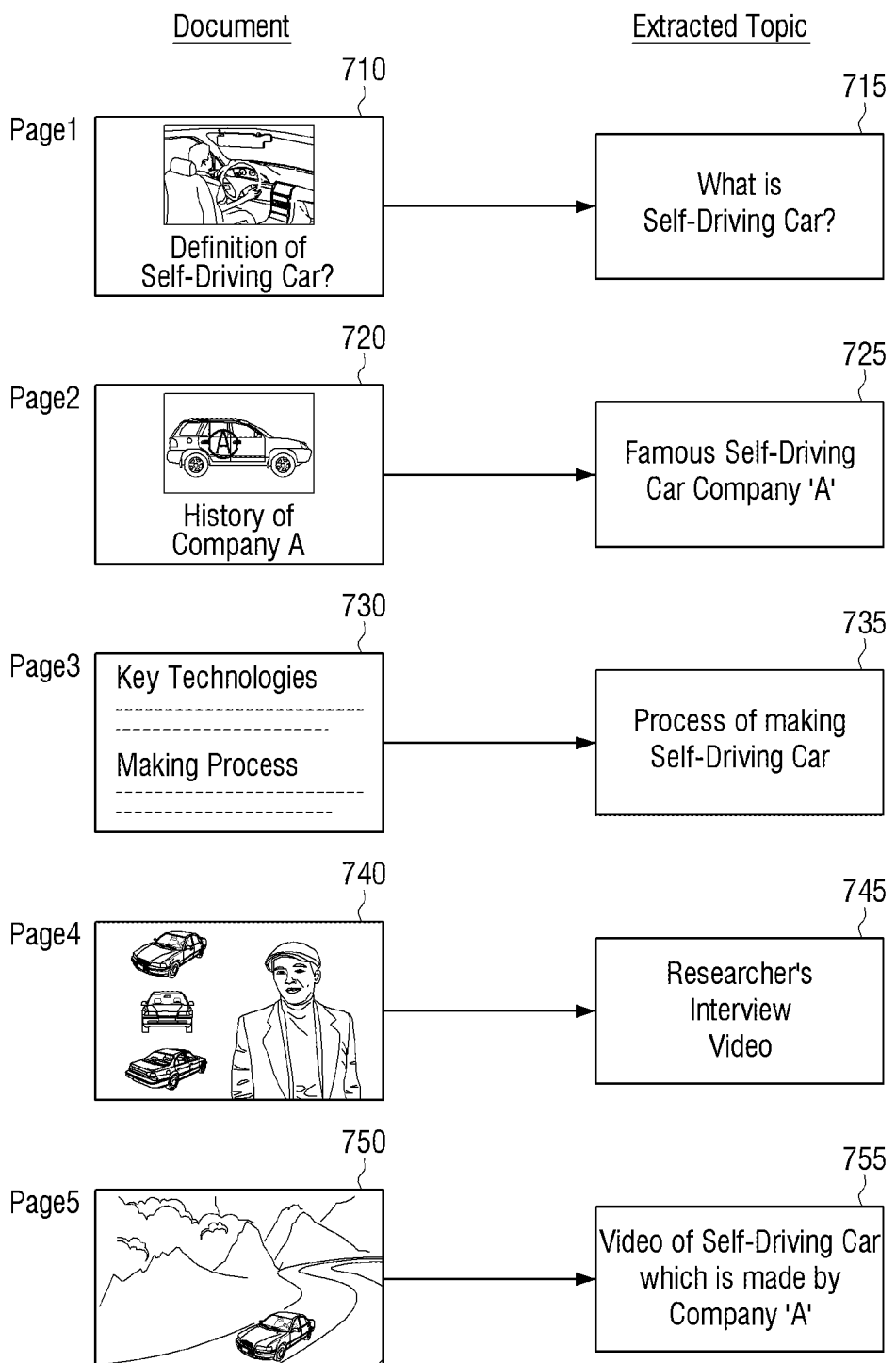
FIG. 7 is a diagram illustrating an example of extracting a topic from a document having a plurality of pages.

FIG. 7 is a diagram illustrating an example wherein the electronic apparatus 100 according to an embodiment of the disclosure extracts topics from a document. On the left side of FIG. 7, a document consisting of five pages is illustrated. On the right side of FIG. 7, topics acquired from each page are illustrated.

The first page 710 of the document includes an image of an autonomous vehicle and a text regarding definition of an autonomous vehicle. The processor 130 may extract a topic 715 from a content (an image and a text) included in the first page 710. For example, by using an image analysis model trained by a deep learning method, the processor 130 may recognize that the image included in the first page 710 is an image regarding an autonomous vehicle. Then, through a text summary analysis model trained by a deep learning method, the processor 130 may recognize that the text included in the first page 710 is a text regarding definition of an autonomous vehicle. The processor 130 may sum up the topics extracted from the image and the text and organize them as one topic. Then, the processor 130 may analyze contents included in the first page 710, and extract a topic 715 which is 'What is Self-Driving Car?'

The second page 720 of the document includes an image of an autonomous vehicle produced by 'Company A,' and a text regarding the history of Company A. The processor 130 may extract a topic 725 from a content (an image and a text) included in the second page 720. For example, by using an image analysis model trained by a deep learning method, the processor 130 may recognize that the image included in the second page 720 is an image regarding an autonomous vehicle, and an image regarding a product of Company A. Then, through a text summary analysis model trained by a deep learning method, the processor 130 may recognize that the text included in the second page 720 is a text including a content related to Company A. The processor 130 may sum up the topics extracted from the image and the text, and extract a topic 725 which is 'Famous Self-Driving Car Company A' from the second page 720.

The third page 730 of the document includes a text regarding a core technology and a production process. The processor 130 may extract a topic 735 from a content (a text) included in the third page 730. For example, through a text summary analysis model trained by a deep learning method, the processor 130 may recognize that the text included in the third page 730 is a text including a content related to a core technology and a process of producing an autonomous vehicle. Then, by summing up a plurality of topics extracted from the text, the processor 130 may extract a topic 735 which is 'Process of making Self-Driving Car' from the third page 730.

The fourth page 740 of the document includes an interview video of a researcher regarding an autonomous vehicle.

The processor 130 may extract a topic 745 from a content (a video) included in the fourth page 740. For example, by using a video analysis model trained by a deep learning method, the processor 130 may analyze each frame of the video included in the fourth page 740. Then, in consideration of the content and the temporal order of each frame of the video, the processor 130 may recognize that the video is an interview video of a researcher researching an autonomous driving technology. Through this, the processor 130 may extract a topic 745 which is 'Researcher's Interview Video' from the video included in the fourth page 740.

The fifth page 750 of the document includes a driving video of an autonomous vehicle. The processor 130 may extract a topic 755 from a content (a video) included in the fifth page 750. For example, by using a video analysis model trained by a deep learning method, the processor 130 may analyze each frame of the video included in the fifth page 750. Through this, the processor 130 may recognize that the vehicle that appeared in the driving video is an autonomous vehicle manufactured by Company 'A.' Then, the processor 130 may extract a topic 755 which is 'Video of Self-Driving Car which is made by company A' from the video included in the fifth page 750.

The processor 130 according to an embodiment of the disclosure may recognize a user voice and match it with a topic acquired in each page of a document. Then, the processor 130 may control the display unit 120 to display a page including the matched topic. Hereinafter, the matching operation will be described with reference to FIG. 7.

For example, if a voice "As an example of an autonomous vehicle, there is a vehicle of Company A" is input from a user, the processor 130 may analyze the user voice and compare it with the topics extracted from the document. Then, based on a content of analyzing the voice, the processor 130 may identify that the content of the input voice matches the topic 725 which is 'Famous Self-Driving Car Company A' of the second page 720. In response to the matching result, the processor 130 may control the display unit 120 to display the second page 720.

Further, if a voice "What would the performance of an autonomous vehicle of Company A be like?" is input from the user, the processor 130 may analyze the user voice and compare it with the topics extracted from the document. Then, based on a content of analyzing the voice, the processor 130 may identify that the content of the input voice matches the topic 755 which is 'Video of Self-Driving Car which is made by company A' of the fifth page 750. In response to the matching result, the processor 130 may control the display unit 120 such that the display screen is converted from the currently displayed second page 720 to the fifth page 750.

Then, if a voice "Let's watch a video regarding a technology for an autonomous vehicle" is input from the user, the processor 130 may analyze the user voice and compare it with the topics extracted from the document. The processor 130 may identify that the content of the input voice matches the content of the video of the fourth page 740. In response to the matching result, the processor 130 may control the display unit 120 such that the display screen is converted from the currently displayed fifth page 750 to the fourth page 740.

Figure 8:
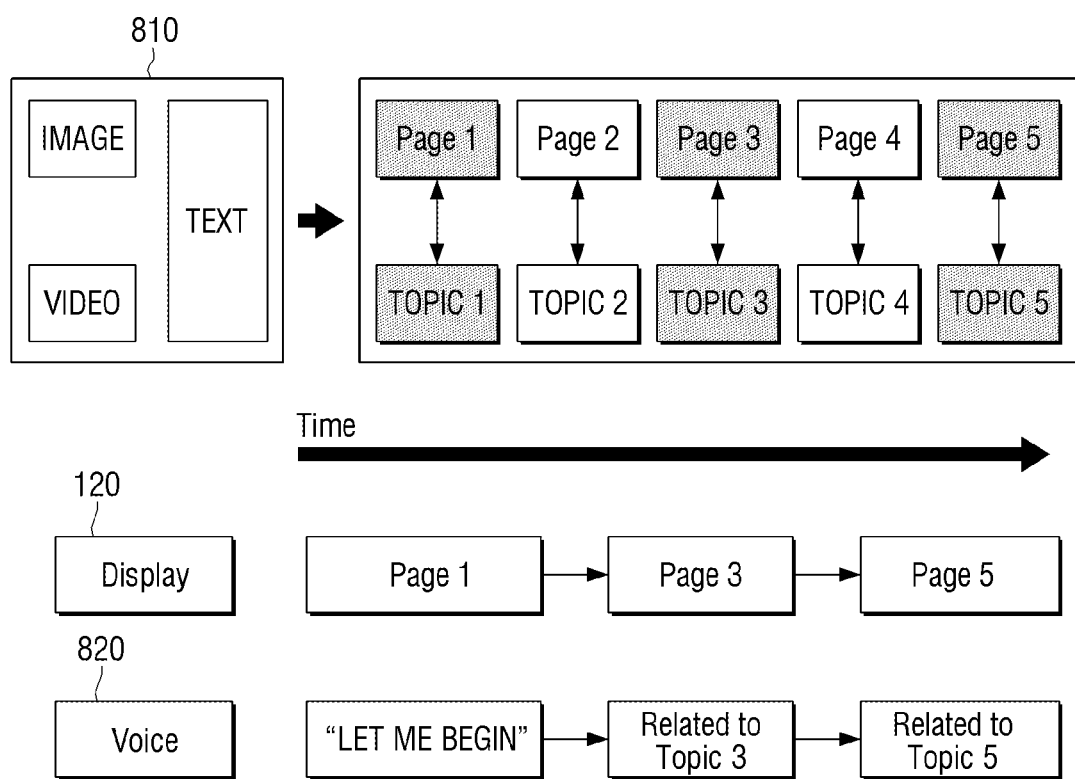
FIG. 8 is a diagram for illustrating a method of automatically displaying a related page when a presentation material is explained according to an embodiment of the disclosure.

FIG. 8 is a diagram for illustrating an electronic apparatus 100 that automatically displays a related page when a presentation material is explained according to an embodiment of the disclosure.

The processor 130 may extract a topic from a content included in each page of a document. Through this, the processor 130 may generate information wherein the pages of the document are matched with topics (or contents). Also, the processor 130 may recognize a user voice by using a voice model trained by using a method like deep learning. As the processor 130 can understand the context of the user voice, the processor 130 may match one of the topics extracted from the document with the recognized voice, even if a word corresponding to the page or the topic is not included. By using the matching result, the processor 130 may control the display unit 120 to display a page related to the content of explanation when the user explains a presentation material.

Taking FIG. 8 as an example, a document 810 may consist of a plurality of pages including contents such as images, videos, texts, etc. Meanwhile, it is assumed that each page of the document 810 includes a content that is different from one another. By analyzing the document 810 by a deep learning method, the processor 130 may extract five topics that are different from one another from the five pages of the document 810. Then, the processor 130 may store information on pages corresponding to the extracted topics.

Through the microphone 110, a user voice 820 by which the user explains the content of the document 810 may be input. The processor 130 may recognize the user voice and determine whether it matches at least one extracted topic. Also, even if the user voice does not match a topic, the processor 130 may determine a page to be displayed from the user voice from which page information can be figured out.

When a user voice "Let me begin" is input, the processor 130 may recognize the input user voice, and figure out that the first page should be displayed. Then, the processor 130 may control the display unit 120 to display the first page of the document 810.

Further, the processor 130 may recognize the input user voice, and match it with an extracted topic. For example, the processor 130 may analyze the input user voice, and recognize that the user voice is a content regarding topic 3. Based on the recognition result, the processor 130 may match the user voice with the topic 3. Then, the processor 130 may control the display unit 120 to display the third page including the topic 3. Further, if a user voice explaining a content regarding topic 5 is input, the processor 130 may control the display unit 120 to display the fifth page including the topic 5.

Even if a word explicitly indicating a page is not included in a user voice, the electronic apparatus 100 may analyze voices sequentially input from the user, and make pages including corresponding contents displayed. Accordingly, the user may make a presentation material related to a content being explained displayed, without an additional hardware operation or assistant.

Figure 9:
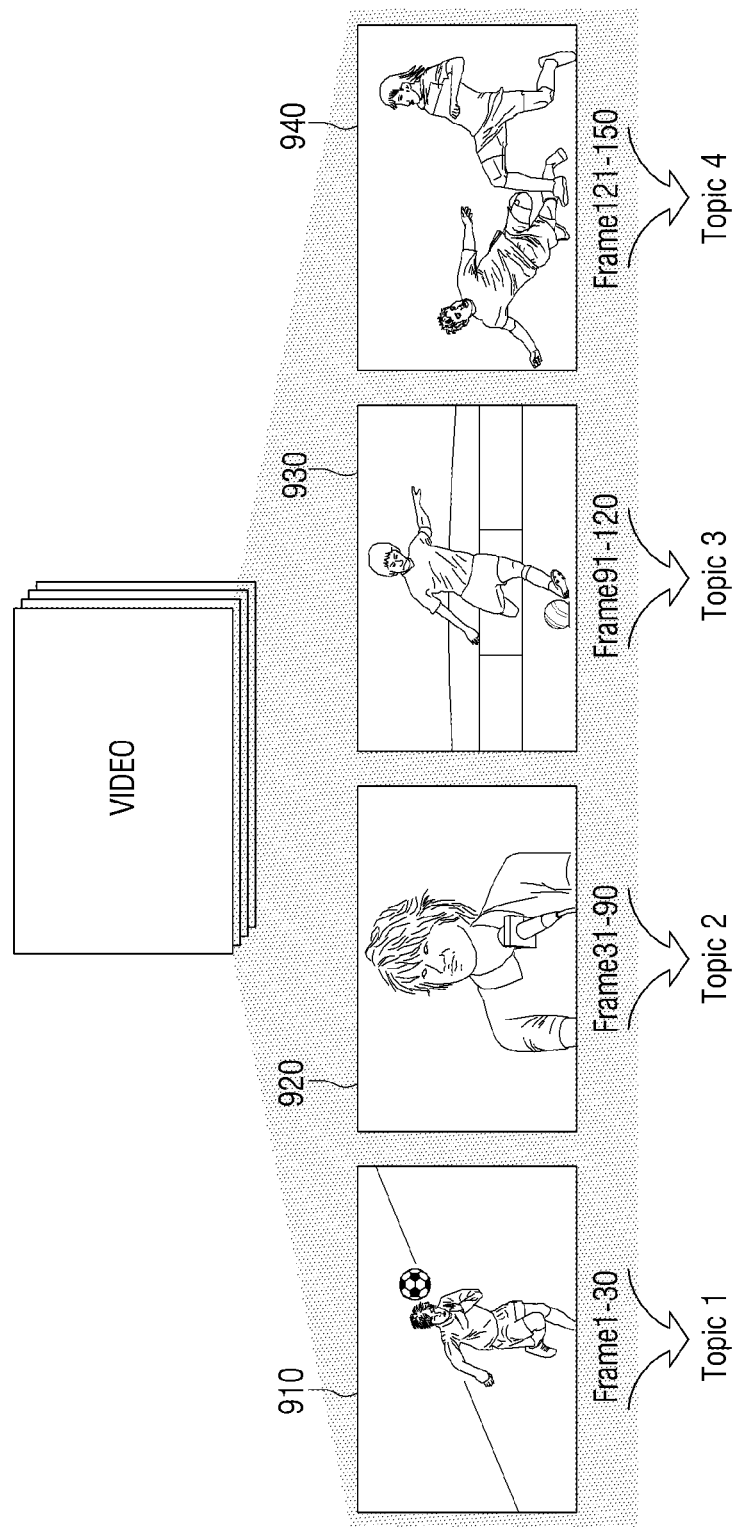
FIG. 9 is a diagram for illustrating a method of acquiring a topic in case video contents are included in a document.

FIG. 9 is a diagram for illustrating a method of acquiring a topic in case video contents are included in a document. In case contents included in a document are videos, the processor 130 may analyze the contents in units of frames constituting the videos. Then, the processor 130 may acquire at least one topic from the videos. Also, the processor 130 may store information on a frame wherein a content for the acquired at least one topic is reproduced. For example, the processor 130 may store information on a frame wherein contents for a plurality of topics start to be reproduced. By using the stored frame information, the processor 130 may control the display unit 120 to reproduce videos from a frame wherein a content for the matched topic starts to be reproduced.

Taking FIG. 9 as an example, the processor 130 may analyze frames constituting video contents, and acquire four topics. Here, it is assumed that the video contents in FIG. 9 consist of 150 frames. The processor 130 may analyze each frame according to a standard learned by a deep learning method, and classify frames in units of topics.

For example, the processor 130 may classify a video content into a frame group 1 (910, frames 1 to 30) including a scene of training of soccer players, a frame group 2 (920, frames 31 to 90) including a scene of an interview of a player A, a frame group 3 (930, frames 91 to 120) including a scene of a goal by the player A, and a frame group 4 (940, frames 121 to 150) including a scene that the player A falls down.

The processor 130 may store information on the frames 1, 31, 91, and 121 which are the frames wherein the content for each topic starts by matching it with the topics. Also, the processor 130 may store information on the frames 30, 90, 120, and 150 which are the frames wherein the content for each topic ends by matching it with the topics. For example, information on the frames may be their temporal locations in the entire video contents.

Also, the processor 130 may control the display unit 120 such that videos are reproduced from a frame wherein a content for a topic matched with an input user voice starts. For example, if a user voice "Let's watch the scene of the goal again" is input, the processor 130 may determine that the input user voice matches the topic of the frame group 3. Then, the processor 130 may control the display unit 120 such that a page including the video content is displayed among a plurality of pages of the document. Further, the processor 130 may control the display unit 120 such that the video content is not reproduced from the first frame, but is reproduced from the frame 91 which is a frame wherein a content corresponding to the matched topic starts. Meanwhile, the processor 130 may control the display unit 120 to reproduce the video content only until the frame 120 wherein the content for the matched topic ends.

As another example, if a user voice "Today's victory is because of the players' strenuous efforts" is input, the processor 130 may determine that the input user voice matches the topic of the frame group 1. Then, the processor 130 may control the display unit 120 such that the video content is reproduced from the frame 1 which is a frame wherein a content corresponding to the matched topic starts. Meanwhile, the processor 130 may control the display unit 120 to reproduce the video content only until the frame 30 wherein the content for the matched topic ends.

Figure 10:
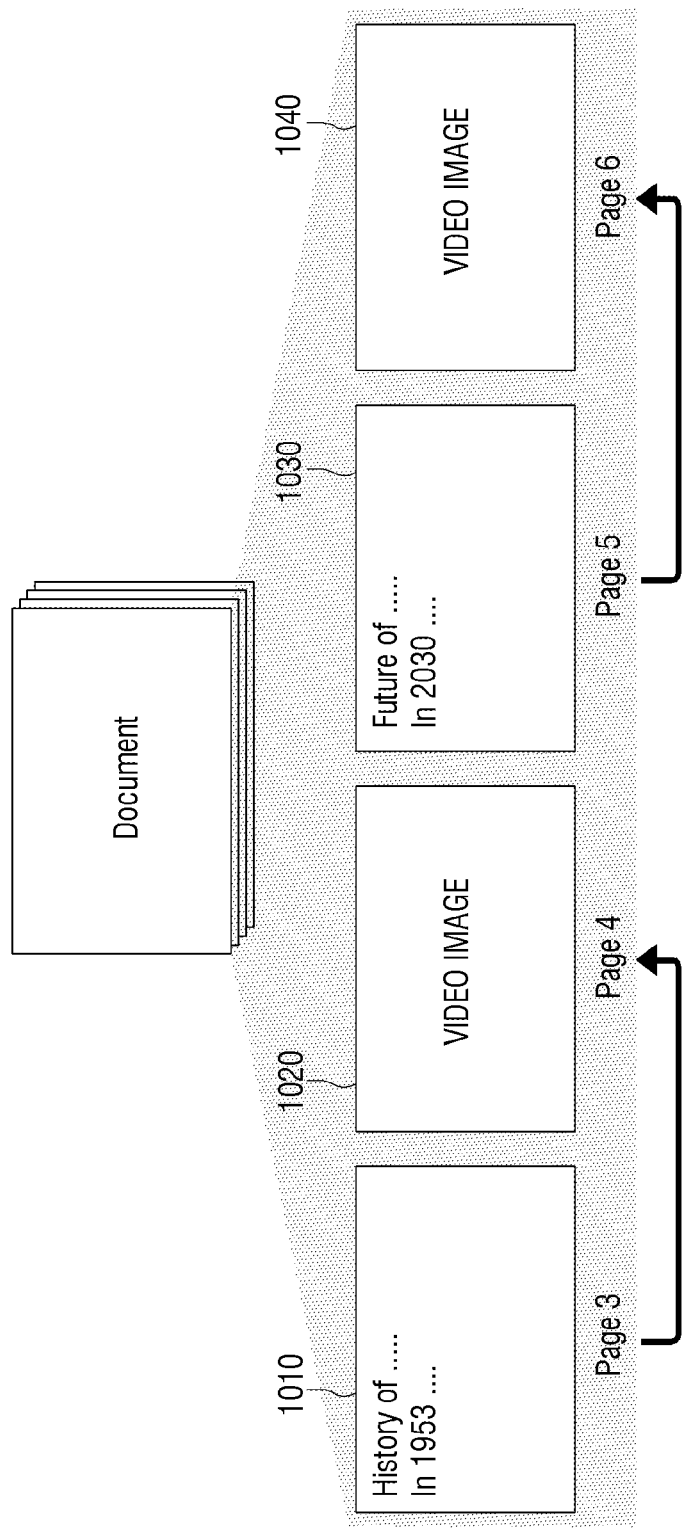
FIG. 10 is a diagram for illustrating a content of determining a page to be displayed by using a relation among pages according to an embodiment of the disclosure.

FIG. 10 is a diagram for illustrating a content of determining a page to be displayed by using a relation among pages according to an embodiment of the disclosure. In the case of a page wherein only a video content exists, the processor 130 may extract a topic through video analysis. However, the processor 130 may infer the content of the video in consideration of its relation with an adjacent page, without video analysis. Also, the processor 130 may use a topic extracted from an adjacent page in extracting the topic of the video content.

In the embodiment of FIG. 10, the third page 1010 of the document may include a text for the history of year 1953. Meanwhile, the fifth page 1030 of the document may include a text regarding prediction of the future in year 2030. Also, the fourth page 1020 and the sixth page 1040 of the document may respectively include video contents. The fourth page 1020 may include a video that photographed what life was like in year 1953, and the sixth page 1040 may include a video that predicted what life would be like in year 2030.

For example, the processor 130 may independently analyze a video content included in the fourth page 1020 of the document, and extract a topic.

As another example, the processor 130 may first analyze the texts of the third page 1010 and the fifth page 1030 that are adjacent to the fourth page 1020 of the document. Then, the processor 130 may analyze the video content included in the fourth page 1020 by adding weights to the topics extracted from the third page 1010 and the fifth page 1030.

As still another example, from the fact that the constitution of a document is in the order of a text-a video-a text-a video, the processor 130 may determine that contents having the same topic are arranged in the order of a text and a video. As text analysis can be performed with fewer resources than in video analysis, the processor 130 may infer the content of a video by performing text analysis first.

Figure 11:
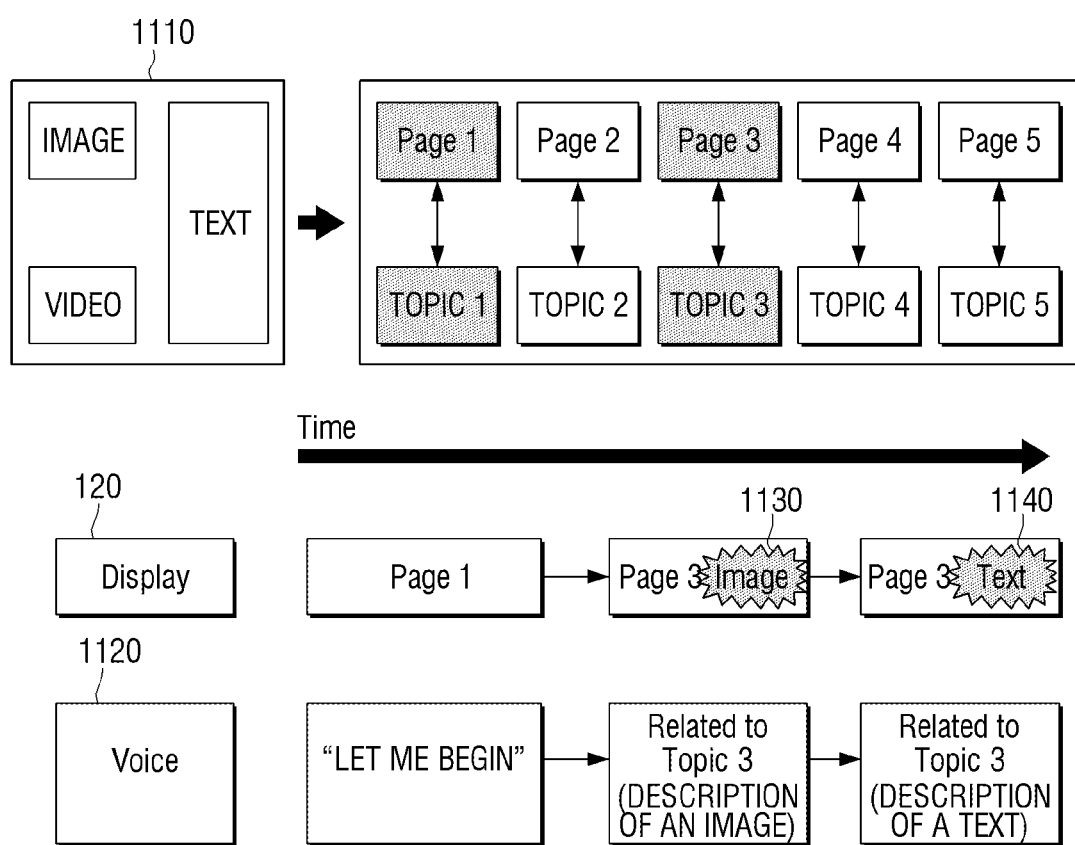
FIG. 11 is a diagram for illustrating a method of highlighting a content corresponding to a matched topic according to an embodiment of the disclosure.

FIG. 11 is a diagram for illustrating an electronic apparatus 100 that automatically displays a related page when a presentation material is explained, and highlights a content corresponding to the matched topic according to an embodiment of the disclosure.

The processor 130 may extract a topic from a content included in each page of a document. The processor 130 may generate not only information wherein pages of the document are matched with topics, but also information wherein a content of each page is matched with a topic.

The processor 130 may recognize a user voice by using a voice model trained by using a deep learning method. As a user voice can be recognized in real time, the processor 130 may determine a page corresponding to a topic. Also, the processor 130 may match one of a plurality of contents included in pages with the recognized user voice. By using the matching result, the processor 130 may display a page related to the content of explanation when the user explains a presentation material, and highlight a content matched with the user voice among the plurality of contents included in the pages. Through this, the audience listening to the presentation can clearly figure out which portion the presenter is currently explaining, without an additional operation by the presenter.

Taking FIG. 11 as an example, a document 1110 may consist of a plurality of pages including contents such as images, videos, texts, etc. Also, some pages of the document 1110 may include a plurality of contents. By analyzing contents by using a deep learning method, the processor 130 may extract topics from each of the five pages of the document 1110. Then, the processor 130 may store information on a page and information on a content corresponding to the extracted topic.

Through the microphone 110, a user voice 1120 by which the user explains the content of the document 1110 may be input. The processor 130 may recognize the user voice and determine whether it matches at least one extracted topic. Also, the processor 130 may determine which content among a plurality of contents included in a page corresponding to the matched topic the input user voice explains.

When a user voice "Let me begin" is input, the processor 130 may recognize the input user voice, and figure out that the first page should be displayed. Then, the processor 130 may control the display unit 120 to display the first page of the document 1110.

Further, the processor 130 may recognize the input user voice, and match it with an extracted topic. For example, when a user voice explaining a content for the topic 3 is input, the processor 130 may match the user voice with the topic 3, and control the display unit 120 to display the third page including the topic 3.

Also, the processor 130 may recognize a user voice in real time, and determine which of the contents included in the third page is being explained. For example, if a user voice explaining a content for an image content in the third page is input, the processor 130 may highlight the image content 1130. Then, if a user voice explaining a content for a text content in the third page is input, the processor 130 may highlight the text content 1140.

Figure 12A:
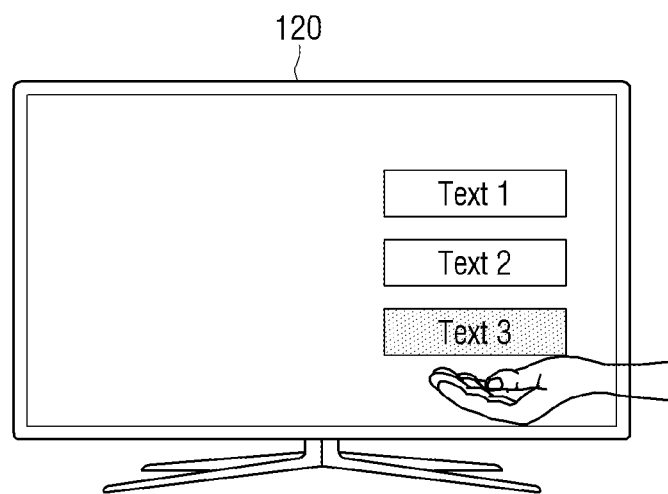
FIG. 12A is a diagram illustrating a highlight or pointer indication corresponding to a user motion according to an embodiment of the disclosure.

According to an embodiment of the disclosure, the processor 130 may indicate a content indicated by a user motion recognized at the motion sensor 150 with highlight or with a pointer. Referring to FIG. 12A, a user may take a motion of propping up one of a plurality of contents included in a document with his or her hand. Based on the user motion recognized by the motion sensor 150, the processor 130 may determine which content the user is trying to emphasize. Also, the processor 130 may determine which point of the document the user is directing through the direction, location, angle, shape, etc. of the hand. Further, the processor 130 may control the display unit 120 to highlight the determined content.

Figure 12B:
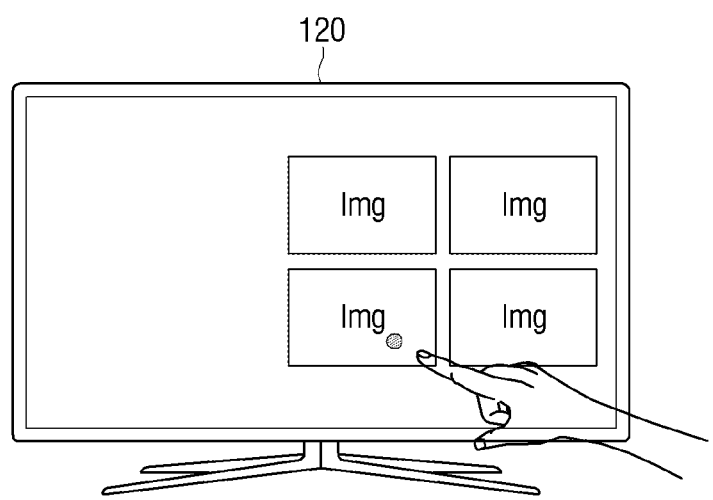
FIG. 12B is a diagram illustrating a highlight or pointer indication corresponding to a user motion according to an embodiment of the disclosure.

Referring to FIG. 12B, a user may take a motion of pointing one of a plurality of contents included in a document with his or her finger. Based on the user motion recognized by the motion sensor 150, the processor 130 may determine which content the user is pointing. Then, the processor 130 may control the display unit 120 to display a pointer on the determined content.

In the embodiments of FIG. 12A and FIG. 12B, it was described that a specific motion corresponds to a highlight indication or a pointer indication. However, this is merely an example, and it is not limited that the aforementioned motion necessarily corresponds to an action. That is, it is also possible that the processor 130 controls the display unit 120 to display a pointer on a content in response to a motion of pointing with a finger.

Figure 13A:
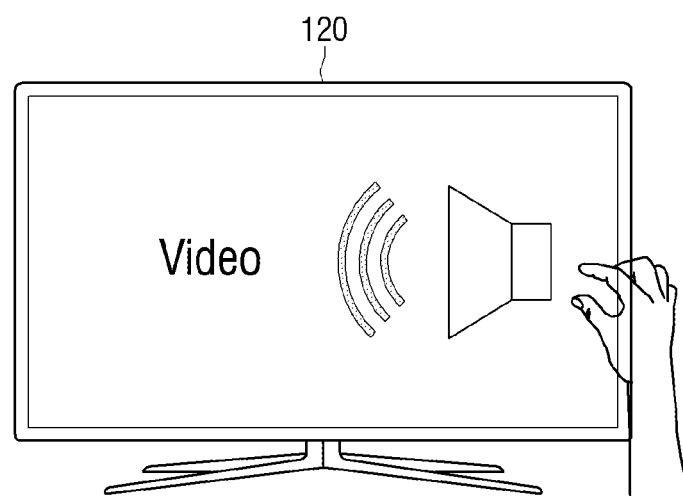
FIG. 13A is a diagram for illustrating learning a user motion by matching the user motion with a control operation according to an embodiment of the disclosure.
Figure 13B:
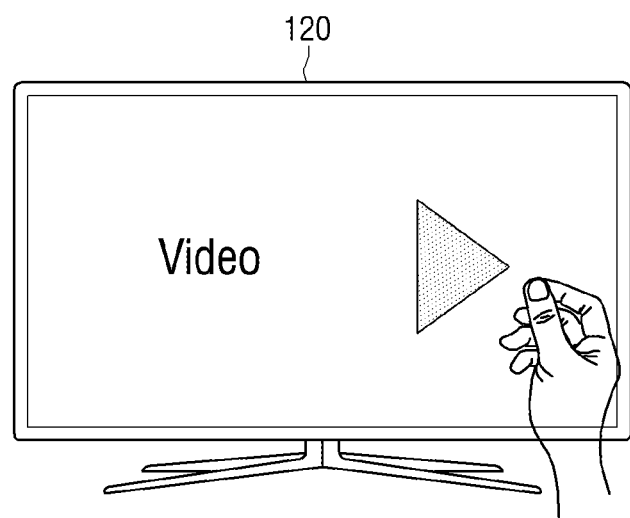
FIG. 13B is a diagram for illustrating learning a user motion by matching the user motion with a control operation according to an embodiment of the disclosure.
Figure 13C:
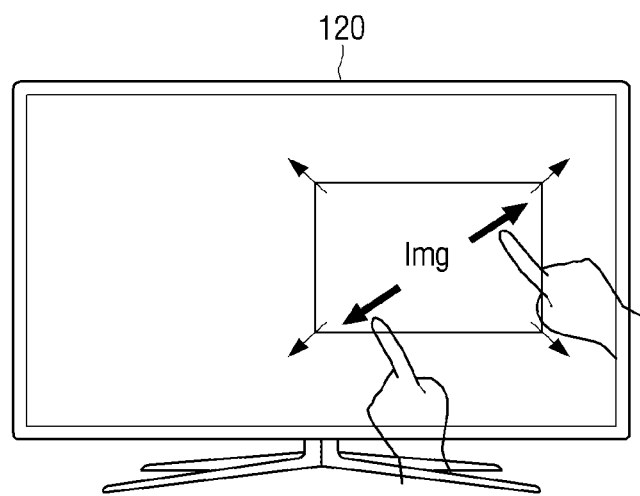
FIG. 13C is a diagram for illustrating learning a user motion by matching the user motion with a control operation according to an embodiment of the disclosure.

According to an embodiment of the disclosure, the processor 130 may determine a control operation that a user wants based on an input voice. Then, the processor 130 may match a user motion when the voice was input with the determined control operation and learn the motion. Through this, the processor 130 may construct a personalized motion control model. When a learned user motion is recognized, the processor 130 may perform the matched control operation by using the motion control model. FIGS. 13A to 13C are diagrams illustrating an example of matching of a user motion with a control operation.

In an initial stage, a user may take a user motion as illustrated in FIG. 13A, while uttering voices such as "I'll adjust the volume," "Can't you hear it well?" and "The sound is too loud." The processor 130 may recognize that all the contents of the input user voices are related to adjustment of the volume. Then, the processor 130 may learn that a user wants to adjust the volume when a user motion illustrated in FIG. 13A is taken.

Also, a user may take a user motion as illustrated in FIG. 13B, while uttering voices such as "I'll continue my explanation after watching the video," "Please pause it for a moment" and "Please play it again." The processor 130 may recognize that the contents of the input user voices are related to playing/pausing of a video. Then, the processor 130 may match the user motion illustrated in FIG. 13B with video playing/pausing control operations.

In addition, a user may take a user motion as illustrated in FIG. 13C, while uttering voices such as "Shall we look at the photo closely?" and "We'll examine the photo mainly focused on the lower left part." The processor 130 may recognize that the contents of the input user voices are related to enlargement/reduction. Then, the processor 130 may learn that a user wants to enlarge/reduce a material when a user motion illustrated in FIG. 13C is taken.

If a user motion is recognized during a presentation, the processor 130 may determine whether the recognized motion matches a learned motion. Then, if it is determined that the recognized motion matches a learned motion, the processor 130 may perform a control operation corresponding to the learned motion. For example, if it is determined that the recognized motion matches the motion illustrated in FIG. 13B, the processor 130 may control the display unit 120 to start playing a video.

According to an embodiment of the disclosure, the processor 130 may first identify whether a word indicating a page is included in a recognized voice. If it is identified that a word indicating a page is included, the processor 130 may not perform matching of a topic extracted from a document and the recognized voice. Without a matching process, the processor 130 may control the display unit 120 to display a page indicated by the identified word. In contrast, if it is identified that a word indicating a page is not included, the processor 130 may match the recognized voice with at least one topic acquired from a document.

For example, if user voices such as "Let's look at the next page" and "We'll look at page 4" are input, the processor 130 may identify that words indicating pages such as "the next page" and "page 4" are included. In such a case, the processor 130 may control the display unit 120 to directly display the pages which can be figured out from the words (the next page of the current page, page 4) without a topic matching process.

According to an embodiment of the disclosure, the processor 130 may match a user voice with a topic acquired from a document by using data for practice for a presentation. The processor 130 may determine a page to be displayed by different methods according to available data. For example, data for practice for a presentation may be data with respect to the order by which a presenter turned the pages of a presentation material, and the voices that the presenter uttered at a time point when each page was displayed before a presentation.

The processor 130 may match a voice uttered by a presenter with a voice included in data for practice for a presentation. As a voice included in data for practice for a presentation is associated with a page of a presentation material, the processor 130 may determine a page to be displayed without a process of analyzing a document and acquiring a topic. That is, instead of matching a topic acquired from a document and an input user voice and determining a page to be displayed, the processor 130 may match a voice included in data for practice for a presentation and an input user voice, and determine a page to be displayed.

In case a user voice does not match a voice included in data for practice for a presentation even though data for practice for a presentation is used, the processor 130 may match a topic acquired from a document and an input user voice and determine a page to be displayed.

According to the aforementioned various embodiments of the disclosure, the electronic apparatus 100 is capable of recognizing contents of a document and a user voice by a learning algorithm like deep learning. Also, the electronic apparatus 100 may make a specific page of a document including a content corresponding to the content of a user voice displayed based on a recognition result.

Figure 14:
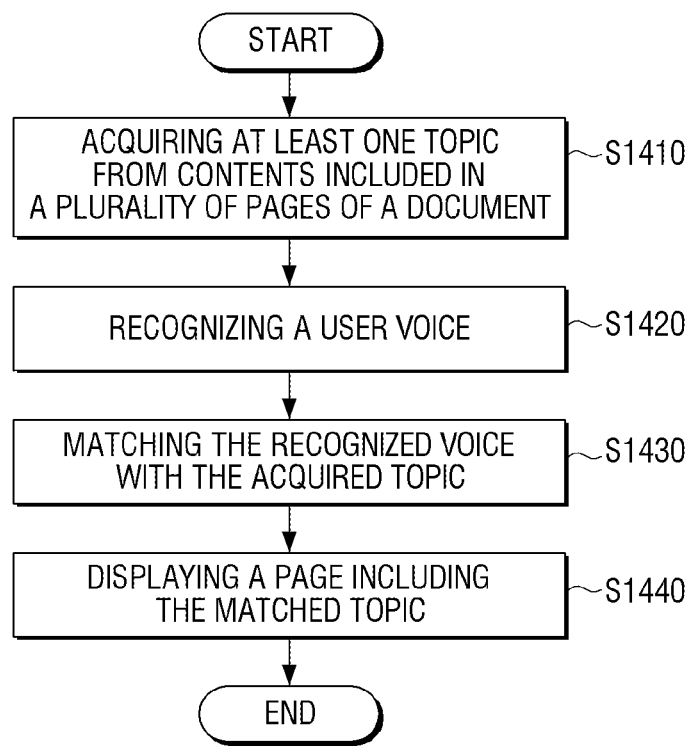
FIG. 14 is a flow chart for illustrating a document displaying method of an electronic apparatus according to an embodiment of the disclosure.

FIG. 14 is a flow chart for illustrating a document displaying method of an electronic apparatus 100 according to an embodiment of the disclosure. Referring to FIG. 14, the electronic apparatus 100 may acquire at least one topic from contents included in a plurality of pages constituting a document at operation S1410. The electronic apparatus 100 may analyze various types of contents such as videos, images, and texts by using artificial intelligence like a deep learning method.

For example, the electronic apparatus 100 may analyze video contents in units of frames and acquire at least one topic. Then, the electronic apparatus 100 may store information on a frame wherein a content for each acquired topic starts to be reproduced and a frame wherein a content ends.

Also, the electronic apparatus 100 may recognize a user voice at operation S1420. By using a voice recognition model constructed by being trained by a deep learning method, the electronic apparatus 100 may understand the context of a user voice. That is, even if a specific word indicating a specific topic is not included, the electronic apparatus 100 may acquire a topic from the context of a user voice.

Meanwhile, a step of acquiring a topic S1410 does not necessarily have to be performed prior to a step of recognizing a user voice S1420 as illustrated in FIG. 14. For example, a user voice may be recognized first, and recognition of a user voice and acquisition of a topic may be performed in parallel.

The electronic apparatus 100 may match a recognized user voice with a topic acquired from a document at operation S1430. By recognizing a user voice in real time and matching it with a topic, the electronic apparatus 100 may determine which portion of a document a presenter is explaining. Then, the electronic apparatus 100 may display a page including the matched topic at operation S1440.

Figure 15:
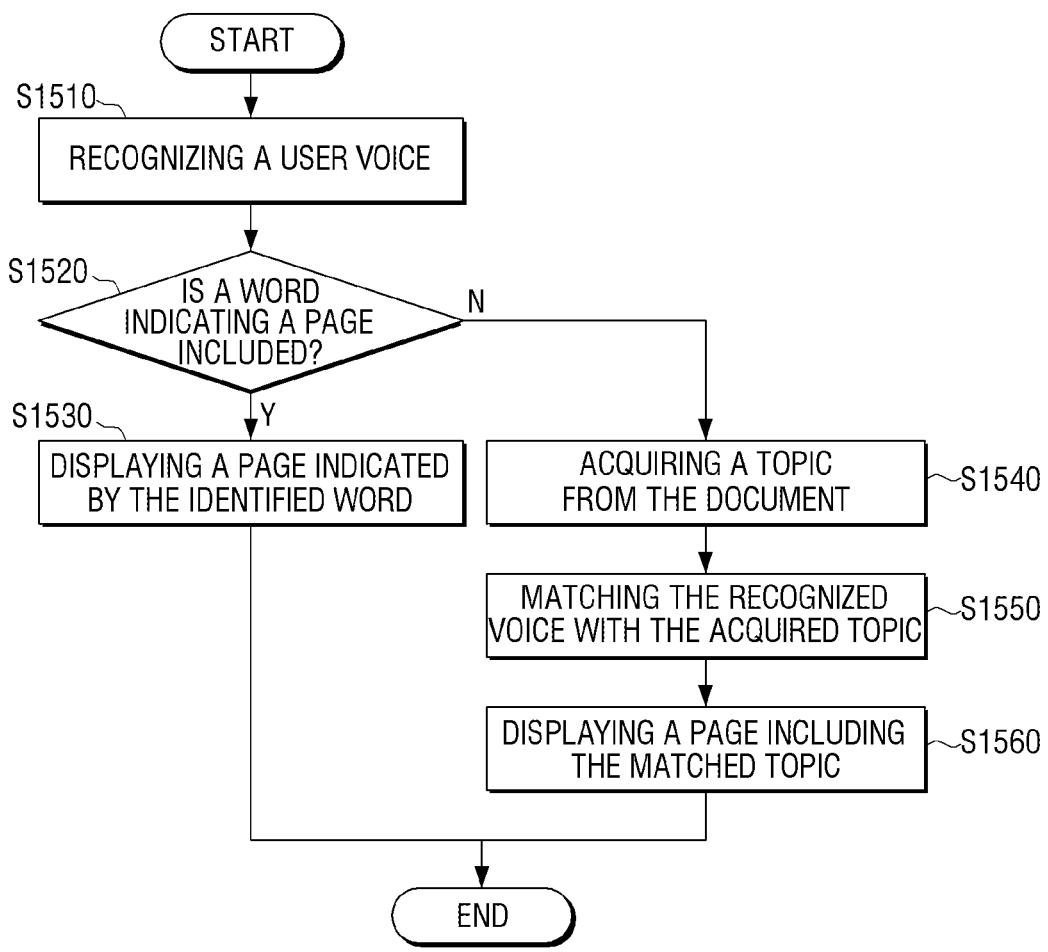
FIG. 15 is a flow chart for illustrating a document displaying method of an electronic apparatus according to an embodiment of the disclosure.

FIG. 15 is a flow chart for illustrating a document displaying method of an electronic apparatus 100 according to an embodiment of the disclosure. The electronic apparatus 100 may recognize a user voice at operation S1510. Then, the electronic apparatus 100 may determine whether the recognized user voice includes a word indicating a page at operation S1520. As examples of a word indicating a page, there are "page 23," "the next page," "the last page," etc.

If a word indicating a page is not included in the recognized user voice at operation S1520-N, the electronic apparatus 100 may determine a page to be displayed through topic matching as in the embodiment illustrated in FIG. 14. That is, the electronic apparatus 100 may acquire a topic from a document at operation S1540, and match the recognized voice with the acquired topic at operation S1550. Then, the electronic apparatus 100 may display a page including the matched topic at operation S1560.

In contrast, if a word indicating a page is included in the recognized user voice at operation S1520-Y, the electronic apparatus 100 may directly determine a page to be displayed without a topic matching process. That is, the electronic apparatus 100 may display a page indicated by the identified word at operation S1530.

Figure 16:
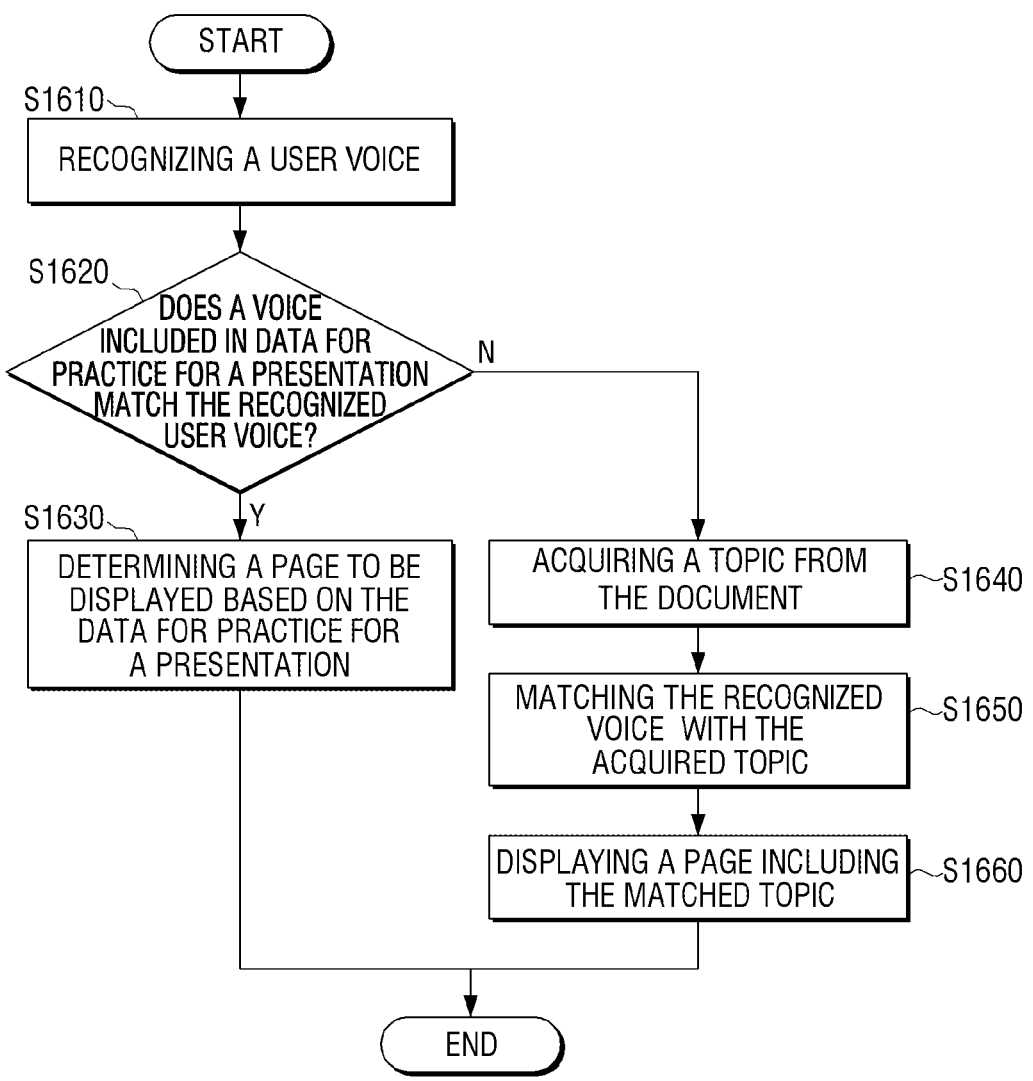
FIG. 16 is a flow chart for illustrating a document displaying method of an electronic apparatus according to an embodiment of the disclosure.

FIG. 16 is a flow chart for illustrating a document displaying method of an electronic apparatus 100 according to an embodiment of the disclosure. The embodiment of FIG. 16 illustrates a method for the electronic apparatus 100 to determine a page to be displayed in case there is data for practice for a presentation. Meanwhile, data for practice for a presentation may be data with respect to the order by which a presenter turned the pages of a presentation material, and the voices that the presenter uttered at a time point when each page was displayed before a presentation.

Referring to FIG. 16, the electronic apparatus 100 may recognize a user voice at operation S1610. Then, the electronic apparatus 100 may determine whether a voice included in data for practice for a presentation matches the recognized user voice at operation S1620.

If the recognized user voice does not match the voice included in the data for practice for a presentation at operation S1620-N, the electronic apparatus 100 may determine a page to be displayed through topic matching as in the embodiment illustrated in FIG. 14. That is, the electronic apparatus 100 may acquire a topic from a document at operation S1640, and match the recognized voice with the acquired topic at operation S1650. Then, the electronic apparatus 100 may display a page including the matched topic at operation S1660.

In contrast, if the recognized user voice matches the voice included in the data for practice for a presentation at operation S1520-Y, the electronic apparatus 100 may determine a page to be displayed based on the data for practice for a presentation without a topic matching process at operation S1630. The data for practice for a presentation may include information on the page that was displayed when a user voice was uttered and input. Accordingly, the electronic apparatus 100 may determine a page that was displayed at a time point when the matched voice was input as a page to be displayed.

Descriptions regarding other embodiments of a document displaying method of the electronic apparatus 100 overlap with the descriptions regarding the electronic apparatus 100, and thus the descriptions will be omitted.

The methods described above may be implemented in the forms of program instructions that can be performed through various computer means, and recorded in computer readable recording media. The computer readable recording media may include program instructions, data files, data structures, etc. as single entities, or in combination. Also, program instructions recorded in the media may be those that were specifically designed and constructed for the disclosure, or may be those that are known and available to those skilled in the field of computer software. Examples of computer readable recording media include magnetic media like a hard disk, a floppy disk, and a magnetic tape, optical media like a CD-ROM and a DVD, magneto-optical media like a floptical disk, and hardware devices that are specifically constructed to store and perform program instructions like a ROM, a RAM, and a flash memory. Meanwhile, examples of program instructions include not only machine language codes that are made by a compiler, but also high level language codes that can be executed by a computer by using an interpreter, etc. Hardware devices like the above may be constructed to operate as at least one software module for performing the operations in the disclosure, and the same is true vice versa.

While the disclosure has been described with reference to limited embodiments and drawings as above, it should be noted that the disclosure is not limited to the aforementioned embodiments, and various amendments and modifications may be made from the descriptions of the disclosure by those having ordinary skill in the art to which the disclosure belongs. Therefore, the scope of the disclosure is not to be defined while being limited to the embodiments described above, but by the appended claims and the equivalents of the claims.

DRAWINGS

FIG. 1
MICROPHONE
PROCESSOR
DISPLAY UNIT
FIG. 2
MICROPHONE
DISPLAY UNIT
PROCESSOR
MEMORY
MOTION SENSOR
COMMUNICATION UNIT
FIG. 3
DATA LEARNING UNIT
DATA RECOGNITION UNIT
FIG. 4A
DATA ACQUISITION UNIT
PRE-PROCESSING UNIT
LEARNING DATA SELECTION UNIT
MODEL LEARNING UNIT
MODEL EVALUATION UNIT
FIG. 4B
DATA ACQUISITION UNIT
PRE-PROCESSING UNIT
RECOGNITION DATA SELECTION UNIT
RECOGNITION RESULT PROVISION UNIT
MODEL UPDATE UNIT
FIG. 8
"LET ME BEGIN"
FIG. 9
VIDEO
FIG. 10
VIDEO IMAGE
FIG. 11
"LET ME BEGIN"
DESCRIPTION OF AN IMAGE
DESCRIPTION OF A TEXT
FIG. 14
START
ACQUIRING AT LEAST ONE TOPIC FROM CONTENTS INCLUDED IN A PLURALITY OF PAGES OF A DOCUMENT
RECOGNIZING A USER VOICE
MATCHING THE RECOGNIZED VOICE WITH THE ACQUIRED TOPIC
DISPLAYING A PAGE INCLUDING THE MATCHED TOPIC
END
FIG. 15
START
RECOGNIZING A USER VOICE
IS A WORD INDICATING A PAGE INCLUDED?
DISPLAYING A PAGE INDICATED BY THE IDENTIFIED WORD
ACQUIRING A TOPIC FROM THE DOCUMENT
MATCHING THE RECOGNIZED VOICE WITH THE ACQUIRED TOPIC
DISPLAYING A PAGE INCLUDING THE MATCHED TOPIC
END
FIG. 16
START
RECOGNIZING A USER VOICE
DOES A VOICE INCLUDED IN DATA FOR PRACTICE FOR A PRESENTATION MATCH THE RECOGNIZED USER VOICE?
DETERMINING A PAGE TO BE DISPLAYED BASED ON THE DATA FOR PRACTICE FOR A PRESENTATION
ACQUIRING A TOPIC FROM THE DOCUMENT

MATCHING THE RECOGNIZED VOICE WITH THE ACQUIRED TOPIC

DISPLAYING A PAGE INCLUDING THE MATCHED TOPIC

END

What is claimed is:

1. An electronic apparatus comprising:
a display unit displaying a document;
a microphone receiving a user voice; and
a processor configured to:
  recognize contents included in a plurality of pages constituting the document,
  acquire at least one topic corresponding to the recognized contents included in the plurality of pages constituting the document,
  recognize a voice input through the microphone,
  match the recognized voice with one of the acquired at least one topic, and
  control the display unit to display a page including the matched topic.

2. The electronic apparatus of claim 1,
wherein the processor is configured to identify a relation among the plurality of pages based on a distance among the plurality of pages and the acquired at least one topic, and
based on a plurality of pages including the matched topic being present, determine the page to be displayed based on the identified relation among the plurality of pages including the matched topic.

3. The electronic apparatus of claim 1, further comprising:
a memory,
wherein the processor is configured to, based on the included contents being videos, analyze the contents in units of frames constituting the videos and acquire at least one topic, and store information on a frame wherein a content for each of the acquired at least one topic starts to be reproduced in the memory.

4. The electronic apparatus of claim 3,
wherein the processor is configured to, by using the information stored in the memory, control the display unit to reproduce the videos from a frame wherein a content for the matched topic starts to be reproduced.

5. The electronic apparatus of claim 1,
wherein the processor is configured to control the display unit to highlight the content corresponding to the matched topic on the displayed page.

6. The electronic apparatus of claim 1, further comprising:
a motion sensor recognizing a user motion,
wherein the processor is configured to control the display unit to highlight a content indicated by the recognized motion.

7. The electronic apparatus of claim 1,
wherein the processor is configured to determine a control operation that the user wants in the voice, control a motion sensor to recognize a user motion when the voice exists, learn the recognized user motion by matching the user motion with the determined control operation, and based on the learned user motion being recognized, perform the matched control operation.

8. The electronic apparatus of claim 1,
wherein the processor is configured to identify whether a word indicating a page is included in the recognized voice, and based on identifying that the word is included, control the display unit to directly display the page indicated by the identified word without matching, and based on identifying that the word is not included, match the recognized voice with one of the acquired at least one topic.

9. A document displaying method of an electronic apparatus comprising:
  recognizing contents included in a plurality of pages constituting the document;
  acquiring at least one topic corresponding to the recognized contents included in a plurality of pages constituting a document;
  recognizing a user voice;
  matching the recognized voice with one of the acquired at least one topic; and
  displaying a page including the matched topic.

10. The document displaying method of an electronic apparatus of claim 9, further comprising:
  identifying a relation among the plurality of pages based on a distance among the plurality of pages and the acquired at least one topic,
  wherein the displaying comprises:
  based on a plurality of pages including the matched topic being present, determining the page to be displayed based on the identified relation among the plurality of pages including the matched topic.

11. The document displaying method of an electronic apparatus of claim 9,
  wherein the acquiring comprises:
  based on the included contents being videos, analyzing the contents in units of frames constituting the videos and acquiring at least one topic, and storing information on a frame wherein a content for each of the acquired at least one topic starts to be reproduced.

12. The document displaying method of an electronic apparatus of claim 11,
  wherein the displaying comprises:
  by using the stored information, reproducing the videos from a frame wherein a content for the matched topic starts to be reproduced.

13. The document displaying method of an electronic apparatus of claim 9, further comprising:
  highlighting the content corresponding to the matched topic on the displayed page.

14. The document displaying method of an electronic apparatus of claim 9,
  further comprising:
  recognizing a user motion; and
  highlighting a content indicated by the recognized motion.

15. The document displaying method of an electronic apparatus of claim 9, further comprising:
  determining a control operation that the user wants in the voice;
  recognizing a user motion when the voice exists;
  learning the recognized user motion by matching the user motion with the determined control operation; and
  based on the learned user motion being recognized, performing the matched control operation.

* * * * *